US011928933B2

(12) United States Patent
Satterlie

(10) Patent No.: US 11,928,933 B2
(45) **Date of Patent: *Mar. 12, 2024**

(54) ITERATIVE RE-SPIN PROCESS FOR ELECTRONIC GAMING MACHINE

(71) Applicant: Aristocrat Technologies Australia Pty Limited, North Ryde (AU)

(72) Inventor: Eric Satterlie, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,373

(22) Filed: Aug. 31, 2021

(65) Prior Publication Data

US 2021/0398392 A1 Dec. 23, 2021

Related U.S. Application Data

(63) Continuation of application No. 16/118,152, filed on Aug. 30, 2018, now Pat. No. 11,127,253.

(Continued)

(51) Int. Cl.

| | |
|---|---|
| ***G07F 17/32*** | (2006.01) |
| ***G06Q 50/34*** | (2012.01) |
| ***G07F 17/34*** | (2006.01) |

(52) U.S. Cl.

CPC ......... *G07F 17/3267* (2013.01); *G06Q 50/34* (2013.01); *G07F 17/3209* (2013.01); *G07F 17/3211* (2013.01); *G07F 17/34* (2013.01)

(58) Field of Classification Search

CPC ............. G07F 17/3267; G07F 17/3209; G07F 17/3211; G07F 17/34

See application file for complete search history.

(56) References Cited

U.S. PATENT DOCUMENTS

| | | | | |
|---|---|---|---|---|
| 2003/0114217 A1* | 6/2003 | Walker | G07F 17/3262 463/20 | |
| 2005/0239539 A1* | 10/2005 | Inamura | G07F 17/3265 463/20 | |

(Continued)

OTHER PUBLICATIONS

"Aristocrat highlights Hold & Spin," downloaded from https://g2easiadaily.com/2018/05/16/aristocrat-highlights-hold-spin/, 5 pp. (May 2018).

(Continued)

*Primary Examiner* — Dmitry Suhol
*Assistant Examiner* — Jason Pinheiro
(74) *Attorney, Agent, or Firm* — Blank Rome LLP

(57) ABSTRACT

Innovations in user interface ("UI") features of electronic gaming machines ("EGMs") are described. For example, control logic controls the UI of an EGM according to an iterative re-spin process, which uses reels and a reel area on a display screen of the EGM. In a given iteration of the re-spin process, the control logic identifies any locked reels. The control logic spins any unlocked reels for the given iteration on the display screen while holding locked reels in place. The control logic evaluates a condition that depends on whether the reel area encloses a special symbol stack for at least one unlocked, spun reel. If the condition is satisfied, the control logic continues the re-spin process. Upon exit from the re-spin process, the control logic determines a count of special symbol stacks in the reel area, determines an outcome of the re-spin process, and outputs an indication of the outcome.

18 Claims, 12 Drawing Sheets

Related U.S. Application Data

(60) Provisional application No. 62/554,299, filed on Sep. 5, 2017.

(56) References Cited

U.S. PATENT DOCUMENTS

| | | | | |
|---|---|---|---|---|
| 2008/0051181 | A1* | 2/2008 | Okada | G07F 17/34 463/20 |
| 2009/0011827 | A1* | 1/2009 | Englman | G07F 17/34 463/27 |
| 2014/0295938 | A1* | 10/2014 | Takahashi | G07F 17/326 463/20 |
| 2019/0051097 | A1 | 2/2019 | Marks | |

OTHER PUBLICATIONS

Brown, "Magic Pearl Pokies from Aristocrat," downloaded from https://australiangambling.ly/aristocrat/magic-pearl/, 5 pp. (date unknown).

Brown, "Sahara Gold Pokies Review from Aristocrat," downloaded from https://australiangambling.ly/aristocrat/sahara-gold/, 6 pp. (date unknown).

Kaur, "Lightening Link," downloaded from https://web.archive.org/web/20171130095631/http://www.freearistocratpokies.com/lightening-link/, 11 pp. (Aug. 2017).

Lee, "Rich Rich Chocolate Respins Review," downloaded from https://www.australiangambling.ly/aristocrat/rich-rich-chocolate-respins/, 5 pp. (date unknown).

"Lightning Link Slots from Aristocrat," downloaded from https://web.archive.org/web/20160521204025/http://www.bestonlinecasinos.com/slots/software/aristocrat/lightning-link/, 6 pp. (May 2016).

"Rich Rich Chocolate Respins Slots," downloaded from https://web.archive.org/web/20170611084532/http://www.vegasslotsonline.com/aristocrat/rich-rich-chocolate-respins/, 4 pp. (Jun. 2017).

"Rich Rich Chocolate Slot Machine," downloaded from https://web.archive.org/20170306123542/https://www.bestonlinecasinos.com/slots/software/aristocrat/rich-rich-chocolate/, 7 pp. (Mar. 2017).

"The Striking Evolution of Lightning Link," downloaded from https://www.aristocrat.com/anz/blog/the-striking-evolution-of-lightning-link/, 4 pp. (Jul. 2019).

Office Action dated May 1, 2020 for U.S. Appl. No. 16/118,152 (pp. 1-16).

Office Action dated Oct. 19, 2020 for U.S. Appl. No. 16/118,152 (pp. 1-15).

Notice of Allowance dated Jun. 3, 2021 for U.S. Appl. No. 16/118,152 (pp. 1-8).

Australian Examination Report No. 1 issued in App. No. AU2018223059, dated Aug. 2, 2023, 4 pages.

* cited by examiner

ITERATIVE RE-SPIN PROCESS FOR ELECTRONIC GAMING MACHINE

CROSS REFERENCE TO RELATED APPLICATION

This patent application is a continuation of U.S. patent application Ser. No. 16/118,152, filed Aug. 30, 2018, the disclosure of which is hereby incorporated by reference. U.S. patent application Ser. No. 16/118,152 claims the benefit of U.S. Provisional Patent Application No. 62/554,299, filed Sep. 5, 2017, the disclosure of which is hereby incorporated by reference.

TECHNICAL FIELD

User interface ("UI") features of electronic gaming machines ("EGMs") are described herein. For example, this patent application describes iterative re-spin processes for EGMs. As another example, this patent application describes approaches to configuring reels in EGMs for special symbol stacking.

BACKGROUND

EGMs provide a variety of wagering games such as slot games, video poker games, video blackjack games, roulette games, video bingo games, keno games and other types of games, which are frequently offered at casinos and other locations for use by players. Play on an EGM typically involves a player placing a wager on one or more outcomes of a base game, also referred to as a primary game. In some cases, a secondary game or bonus round is available on an EGM after a player qualifies by attaining a certain winning combination or event on, or related to, the base game. Once qualified, the player then enters the secondary game or bonus round, where the player is given an opportunity to win extra game credits, game tokens or other forms of payout. In the case of "game credits" that are awarded during play of the base game, secondary game or bonus round, the game credits are typically added to a credit meter total on the EGM and can be provided to the player upon completion of a gaming session or when the player wants to "cash out."

EGMs depend on usability to enhance the user experience and entice users to continue using the EGMs. Although previous EGMs include various UI features that improve usability and enhance the user experience, there is room for further improvement to the UI features of EGMs.

SUMMARY

In summary, the detailed description presents innovations in user interface ("UI") features of electronic gaming machines ("EGMs"). For example, the detailed description presents iterative re-spin processes for EGMs. As another example, the detailed description presents approaches to configuring reels in EGMs for special symbol stacking. In some example implementations, the innovations improve usability of the EGMs by enhancing the user experience, enticing new users to use the EGMs, and maintaining the interest of current users in the EGMs.

According to one aspect of the innovations described herein, control logic controls the UI of an EGM according to an iterative re-spin process. For example, the control logic can be in the EGM or in an electronic gaming server, which is located remotely from the EGM and in communication with the EGM. The control logic starts an iterative re-spin process, which uses reels and a reel area on a display screen of the EGM. Each of the reels of the iterative re-spin process has an associated reel strip that is movable through the reel area on the display screen upon a spin of the reel. For example, the reel area spans m reels of the iterative re-spin process in a first dimension and spans n symbols in a second dimension orthogonal to the first dimension.

In a given iteration of one or more iterations of the iterative re-spin process, the control logic performs various operations. An iteration of the re-spin process can be initiated in response to actuation of a button of the EGM (e.g., a "spin" button), which is indicated by user input. For example, in a given iteration of the re-spin process, the control logic identifies any locked reels, among the reels of the re-spin process, for the given iteration. For each of the identified any locked reels for the given iteration, the reel area on the display screen encloses a special symbol stack. The special symbol stack can be an arrangement of n symbols of a special symbol type in sequence, spanning the reel area on the display screen (a "full" stack of symbols of the special symbol type). The control logic spins any unlocked reels, among the reels of the re-spin process, for the given iteration on the display screen while holding the identified any locked reels for the given iteration in place. In some example implementations, to spin one of the unlocked reels, the control logic moves the reel strip of the reel through the reel area on the display screen, generates a random number, and stops the movement of the reel strip on the display screen at a position of the reel strip that is based at least in part on the random number. After spinning the any unlocked reels, the control logic evaluates a continuation condition that depends at least in part on whether the reel area on the display screen encloses, for at least one of the any unlocked reels for the given iteration, a special symbol stack. The condition can also depend at least in part on the reel area on the display screen not enclosing a special symbol stack for at least one of the reels of the re-spin process (that is, there is at least one unlocked reel to re-spin). If the continuation condition is satisfied, the control logic continues the re-spin process in a next iteration of the one or more iterations as the given iteration.

The control logic determines a count of special symbol stacks in the reel area upon exit from the iterative re-spin process. Then, based least in part on the count of special symbol stacks in the reel area, the control logic determines an outcome of the re-spin process. For example, the control logic sets an amount that progressively increases as the count of special symbol stacks in the reel area increases. The control logic outputs an indication of the outcome of the re-spin process. For example, the control logic renders a graphic (e.g., image, animation) that indicates the outcome of the re-spin process on the (main) display screen or a secondary display screen of the EGM.

In this way, the iterative re-spin process can improve usability of the EGM by enhancing the user experience, enticing new users to use the EGM, and maintaining the interest of current users in the EGM. In particular, the effect of progressively and iteratively locking reels that have special symbol stacks, then re-spinning the remaining unlocked reels, keeps user interest, especially when the outcome depends on the count of special symbol stacks in the reel area.

According to another aspect of the innovations described herein, control logic controls the UI of an EGM, configuring reels for special symbol stacking. For example, the control logic can be in the EGM or in an electronic gaming server, which is located remotely from the EGM and in communication with the EGM. The control logic starts a process that uses reels and a reel area on a display screen of the EGM. Each of the reels of the process has an associated reel strip that is movable through the reel area on the display screen upon execution of a spin of the reel. For example, the reel area spans m reels of the process in a first dimension and spans n symbols in a second dimension orthogonal to the first dimension.

The control logic determines a control level and determines a likelihood of a special symbol type based at least in part on the control level. For example, the likelihood of the special symbol type progressively increases as the control level increases. Based at least in part on the likelihood of the special symbol type, the control logic selectively populates or re-populates the reel strips of the reels of the process with symbols of the special symbol type and symbols of one or more other symbol types. For example, the control logic generates a random number, uses the random number and a weighted table to select a symbol type among the special symbol type and the one or more other symbol types, and then adds a symbol of the selected symbol type at each position of one or more positions of one or more of the reel strips of the reels of the process (or, alternatively, adds symbols of a selected symbol type on a reel-by-reel basis or even position-by-position basis).

In some example implementations, the process is a base process. The special symbol type is a special wild symbol type, and the other symbol type(s) include a normal wild symbol type. As part of the selectively re-populating operation, the control logic generates a random number then uses the random number and a weighted table to select a symbol type among the special wild symbol type and the normal wild symbol type. At each position of one or more positions of the reel strips of the reels of the base process that have a wild symbol, the control logic sets the symbol to be a symbol of the selected symbol type.

In other example implementations, the process is an iterative re-spin process. The special symbol type is a special wild symbol type, and the other symbol type is a blank symbol type. As part of the selectively re-populating operation, for each reel strip of one or more of the reel strips of the reels of the iterative re-spin process, the control logic performs operations for each of multiple positions of the reel strip. The control logic generates a random number then uses the random number and a weighted table to select a symbol type among the special wild symbol type and the blank symbol type. The control logic sets the symbol at the position of the reel strip to be a symbol of the selected symbol type.

The control logic spins any unlocked reels on the display screen. For example, for an unlocked reel, the control logic moves the reel strip of the reel through the reel area on the display screen, generates a random number, and stops the movement of the reel strip on the display screen at a position of the reel strip that is based at least in part on the random number. The control logic locks any of the unlocked reels for which the reel area on the display screen encloses a special symbol stack. For example, the special symbol stack is an arrangement of n symbols of the special symbol type in sequence, spanning the reel area on the display screen (a "full" stack of symbols of the special symbol type).

In this way, the reel configuration for special symbol stacking improves usability of the EGM by enhancing the user experience, enticing new users to use the EGM, and maintaining the interest of current users in the EGM. In particular, the effect of progressively increasing the likelihood of the special symbol type depending on the control level, with corresponding increase in likelihood of special symbol stacking that results in locked reels, keeps user interest, especially when an outcome depends on a count of special symbol stacks in the reel area.

The innovations can be implemented as part of a method, as part of an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations. The drawings are not necessarily drawn to scale.

FIGS. **4*a*-4*c*** are representations of a sequence of example screen shots of a display screen of an EGM for a bonus reel game, according to some example implementations.

Figure 5:
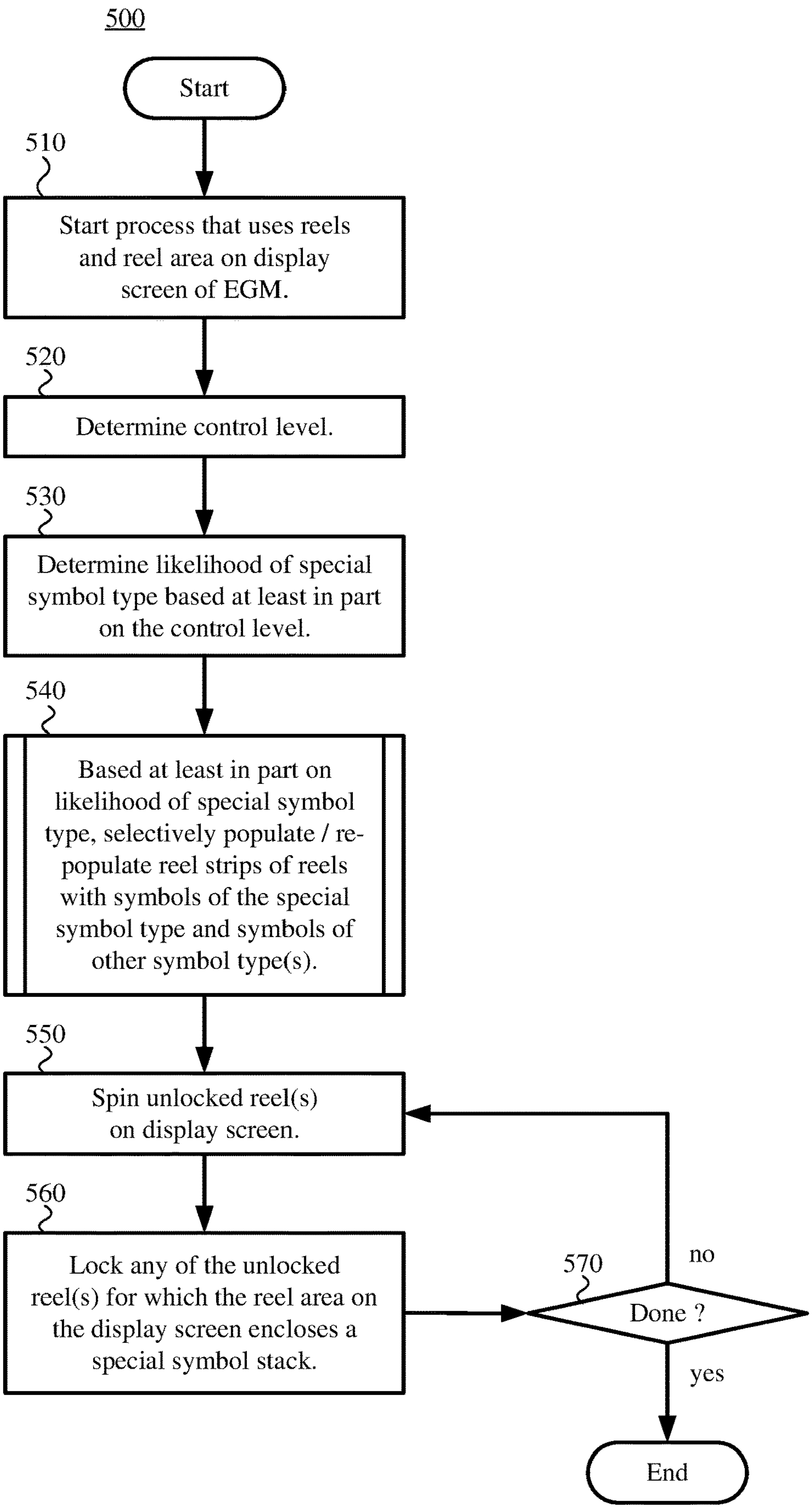

FIG. 5 is a flowchart illustrating a generalized technique for controlling a UI of an EGM for special symbol stacking in a process.

FIGS. **6*a*-6*c*** are flowcharts illustrating example techniques for selectively populating or re-populating reel strips of reels with symbols of a special symbol type or other symbol type.

Figure 7:
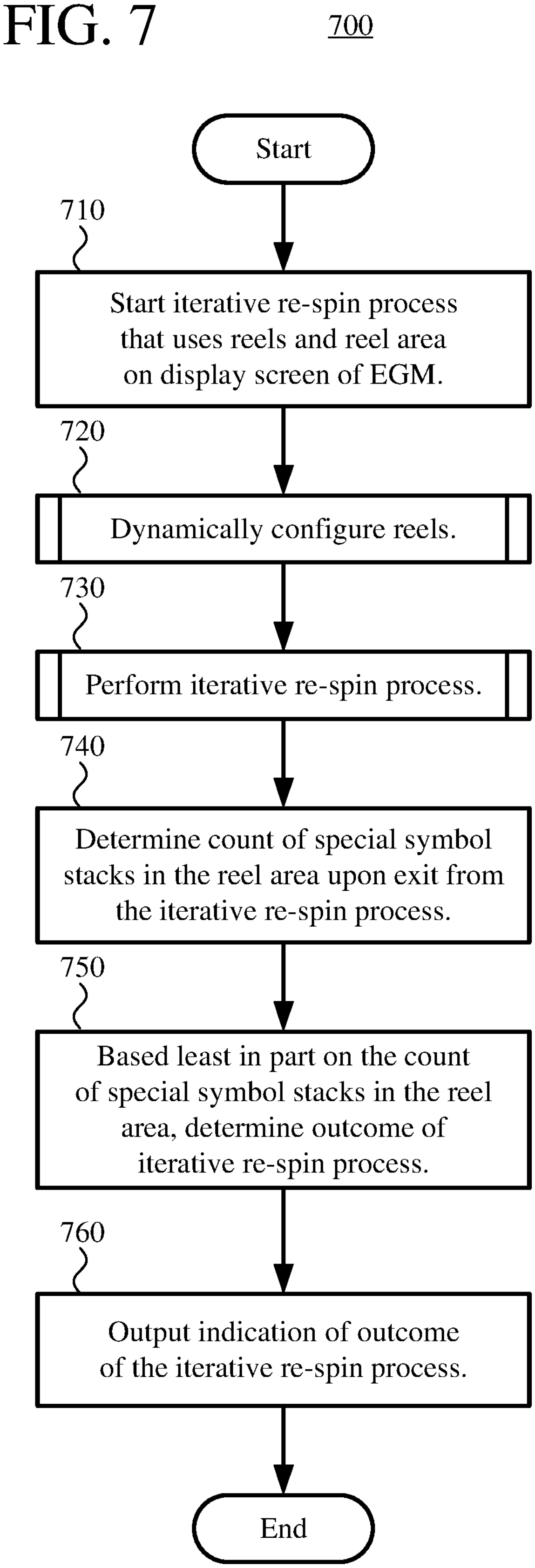

FIG. 7 is a flowchart illustrating a generalized technique for controlling a UI of an EGM for an iterative re-spin process.

Figure 8:
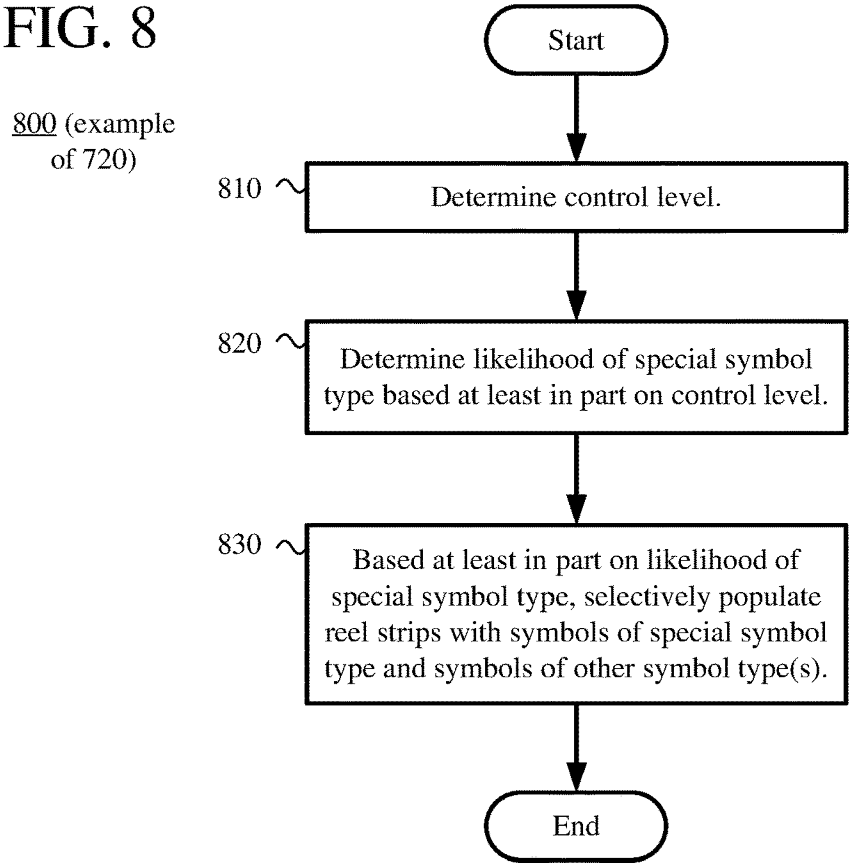

FIG. 8 is a flowchart illustrating an example technique for dynamically configuring reels for an iterative re-spin process.

Figure 9:
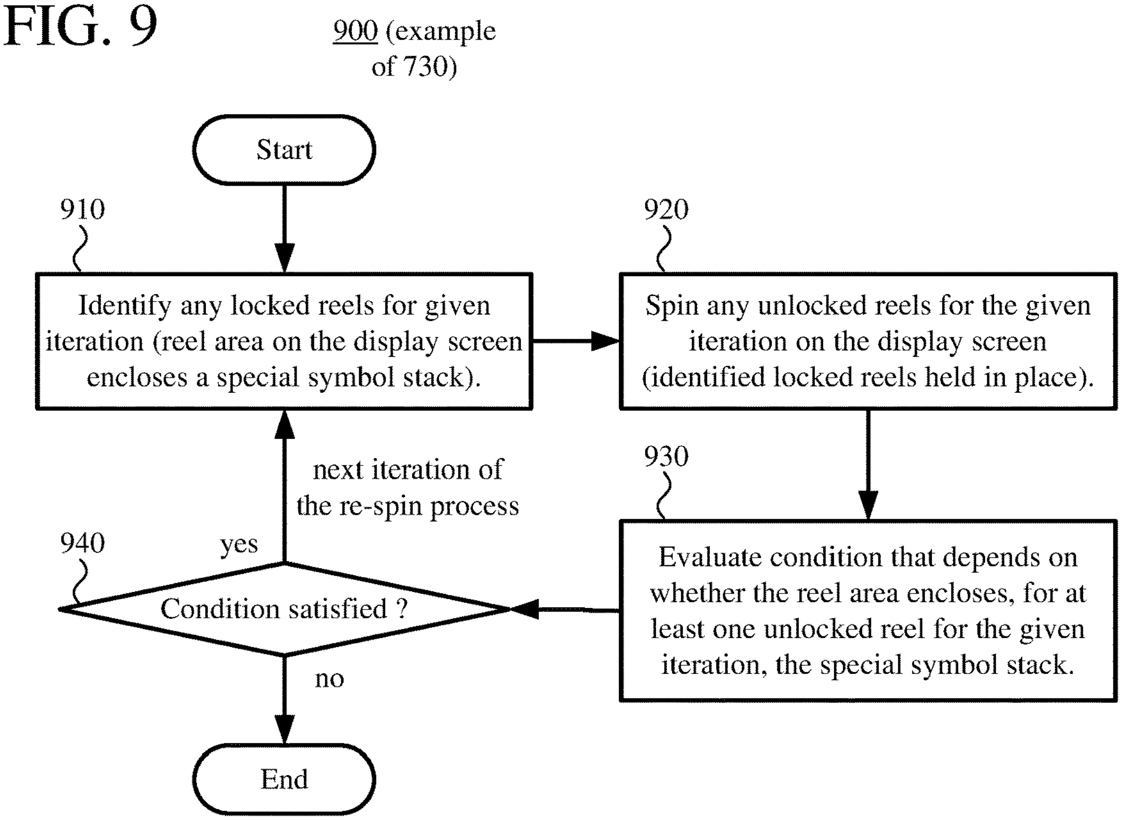

FIG. 9 is a flowchart illustrating an example technique for performing operations of an iterative re-spin process.

DETAILED DESCRIPTION

The detailed description presents innovations in user interface ("UI") features of electronic gaming machines ("EGMs"). For example, some innovations relate to iterative re-spin processes, such as iterative re-spin bonus reel games, for EGMs. As another example, other innovations relate to configuration of reels in EGMs for special symbol stacking, where the reels can be used for a base reel game or iterative re-spin bonus reel game.

In some example implementations, control logic controls the UI of an EGM according to a bonus reel game, which is an example of an iterative re-spin process. The control logic starts the bonus reel game, which uses reels and a reel area on a display screen of the EGM. Each of the reels has an associated reel strip that is movable through the reel area on the display screen upon a spin of the reel. In each of one or more "spins" or "plays" (iterations) of the bonus reel game, the control logic performs various operations. A spin/play of the bonus reel game can be initiated in response to actuation of a button of the EGM (e.g., a "spin" button or "play" button, which may be a physical button or virtual button) by a user.

For example, in a given spin/play of the bonus reel game, the control logic identifies any locked reels for the given spin/play, where the reel area on the display screen encloses a special symbol stack for a locked reel. The special symbol stack can be an arrangement of n symbols of a special symbol type in sequence, spanning (filling) the reel area on the display screen for one reel. The control logic spins any unlocked reels for the given spin/play on the display screen. Any locked reel is held in place on the display screen during the spinning of unlocked reels. If any more special symbol stacks "land" in the reel area for the spinning reels, the control logic locks the reels that enclose special symbol stacks, and any remaining (unlocked) reels can be re-spin in another spin/play of the bonus reel game.

When no more special symbol stacks "land" in the reel area for a spin/play of the bonus reel game, the control logic determines a count of how many reels have landed with special symbol stacks in the bonus reel game. The control logic sets a payout amount that progressively increases as the count of special symbol stacks in the reel area increases, and renders a graphic (e.g., image, animation) that indicates the payout amount.

The progression of payouts in the bonus reel game is visible to the user and adds suspense and interest to game play. The bonus reel game clearly indicates what is needed (another special symbol stack) to reach the next level of a progressive jackpot. In particular, the effect of progressively and iteratively locking reels that have special symbol stacks, then re-spinning the remaining unlocked reels, keeps the interest of users, especially when a payout amount depends on the count of special symbol stacks in the reel area.

In other example implementations, control logic controls the UI of an EGM, configuring reels for special symbol stacking in a base reel game or bonus reel game, which is an example of a process. The control logic starts the base reel game or bonus reel game, which uses reels and a reel area on a display screen of the EGM. The control logic determines a bet level, which is an example of control level, and determines a likelihood of a special symbol type based at least in part on the bet level. For example, the likelihood of the special symbol type progressively increases as the bet level increases. Based at least in part on the likelihood of the special symbol type, the control logic selectively populates or re-populates the reel strips of the reels with symbols of the special symbol type and symbols of one or more other symbol types. The control logic spins unlocked reels on the display screen then locks any of the unlocked reels for which the reel area on the display screen encloses a special symbol stack. The effect of progressively increasing the likelihood of the special symbol type depending on the bet level, with corresponding increase in likelihood of special symbol stacking that results in locked reels, keeps user interest, especially when a payout amount depends on a count of special symbol stacks in the reel area.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present invention is defined by the appended claims.

I. Terminology

Throughout the description that follows, and unless otherwise specified, the following terms may include and/or encompass the example meanings provided in this section. These terms and illustrative example meanings are provided to clarify the language selected to describe examples both in the specification and in the appended claims.

The term "game" may refer to a gambling event with a beginning and end that may encompass one or more spins, handle pulls, or spans of time. The end of the game may be determined voluntarily (in which a player elects to stop play) or involuntarily (in which the gaming device terminates play). In some examples, a game may include non-gambling events such as pachinko games, skill-based games, non-RTP-based games, bonus games, or the like.

The term "primary game" or "base game" may refer to play resulting from the spinning of standard physical or virtual (e.g., electronic, video or graphical) slot reels, the dealing of physical or virtual (e.g., electronic, video, or graphical) cards, or other game outcomes. For example, the outcome of a primary reel game might be cherry-cherry-bar. The term "primary reel game" or "base reel game" may refer to play result from the spinning of standard physical or virtual slot reels.

The term "bonus game," "bonus feature," "feature game," or "secondary game" may refer to an additional game playable on a gaming device that is separate from the primary game. A bonus game typically does not require the player to wager any additional funds or credits, and a bonus game may include the possibility of winning a relatively large payout. In some cases, a bonus game may require an additional wager.

The term "game play parameter" may refer to one or more variables whose one or more values govern one or more aspects of play at one or more gaming devices, exclusive of variables directly related to payout amounts, pay table selection, and payout probabilities. The value of a game play parameter may be determined by a random selection process. Examples include a number of symbol positions on a spinning reel, a reel strip with a pattern of symbols, a number of bar symbols on a given reel, a number of handle pulls for which a bonus mode will remain active, a probability of a game character appearing on a given handle pull, and a required wager amount per handle pull.

The term "game parameter" may refer to one or more variables whose values govern play at the gaming device and are determined by a random selection process. Game parameters include game play parameters. Examples of game parameters may include a payout for a given combination of symbols on consecutive reels, a position number randomly selected on a spinning reel, a number of a specific type of symbols on a given reel, the values of cards in a hand, and a probability of a game character finding hidden virtual treasure. The term "game parameter value" may refer to a value associated with a game parameter, such as 200 coins, 12 cherry symbols, or a 30% chance of finding treasure.

The term "game parameter value symbol" may refer to a reel symbol that represents a game parameter value, such as a reel symbol displaying "200 coins" or five reels collectively displaying "3 cherry symbols." The game parameter value symbol could also be found on other representations of random events such as spinners (e.g., a segmented wheel with a spinning arrow selector), which could be located on a secondary screen.

The term "symbol" may refer to any indicia displayed on a primary or secondary display, whether moving or stationary, whether animated or static. For example, a reel strip for a reel may include symbols at positions of the reel strip.

The term "gaming device" may refer to any electrical, mechanical, or electromechanical device, including an electronic gaming machine ("EGM"), that may accept wagers, step through a process to determine an outcome, and pay winnings based on the outcome. In some examples, the outcome may be randomly generated, as with a typical slot machine; may be generated through a combination of randomness and player skill, as with video poker; or may be generated entirely through player skill. Gaming devices may include slot machines (with virtual and/or mechanical reels), video poker machines, video blackjack machines, video roulette machines, keno machines, video bingo machines, pachinko machines, lottery terminals, handheld gaming devices, and the like. In some embodiments, handheld gaming devices may include smartphones, tablets, and other portable devices. Thus, a gaming device may use specially-configured computer hardware that implements game functionality, or a gaming device may use general-purpose computer hardware that has been programmed to implement game functionality.

The term "handle pull" or "spin" of a game may refer to a single play at a gaming device, whether or not a handle is involved in the play, and whether or not a handle is even included in the gaming device. In other words, a single play could be initiated by a press of a mechanical, electronic, or video overlay (e.g., touchscreen) button or via another activation method. The meaning of "handle pull" or "spin" is intended to be flexible, in that a single handle pull or spin of a game might constitute a single complete game, or a single wager. For example, a handle pull or spin might represent a single spin of the reels or a series of spins which culminate in a final aggregate outcome.

The term "outcome" may refer to a result of a gaming event, such as a specific combination of symbols in a slot machine game, the completion of a puzzle, the attainment of a goal, etc. Diverse types of gaming devices may have widely varying types of outcomes. Several are described in detail herein and still others will be apparent to those of skill in the art based on the present disclosure.

The term "payout" may refer to a prize, an award, winnings, game credits, game tokens, or a bonus associated with a certain outcome or outcomes.

The term "wagering credit" may refer to a representation of value, other than a chip, token or wagering instrument, that is used for wagering at a game, gaming device, race book or sports pool and is obtained by the payment of cash or a cash equivalent, the use of a wagering instrument or the electronic transfer of money. The term "wagering instrument" may refer to a representation of value, other than a chip or token, that is issued by a casino or other establishment for use in a cashless wagering system. The term "representation of value" may refer to any instrumentality used or won by a player in a game whether the instrumentality may be redeemed for cash or not. For example, "comp" points, bonus points, game rewards, a coupon for a free drink, a complimentary night stay at a hotel, a poker chip, a voucher, etc.

The term "return to player percentage" or "RTP" may refer to the average percentage of all the wagered money a gaming device will pay back in winnings to a player for a given amount wagered. For example, if one hundred $1 bets are made on a gaming device in which the RTP is 90%, on average, approximately $90 will be awarded in payouts.

The terms "controller" and "computer" shall be synonymous and may refer to an electronic device (e.g., a personal computer) that communicates with one or more other gaming devices. A controller may function as a computer server and may control some or all operations or actions of the gaming devices, or actions or operations associated with or related to such gaming device(s). A controller may also include one or more databases to record statistics such as coin-in, coin-out, jackpot information, theoretical wins, and the like.

The term "game controller" may refer to a circuit (e.g., an electronic circuit board, a programmable computer chip, an integrated circuit ("IC"), etc.) within a gaming device that includes one or more processors that process game play instructions in accordance with game play rules, and outputs or generates game play outcomes to one or more displays, screens, or monitors. For example, a game controller can process game play instructions, and generate outcomes, as described in Section III. The game play rules may be stored as program code in a memory (for execution by one or more processors of the game controller) but can also be hardwired in a dedicated circuit. In some embodiments, the memory may also store data indicative of a plurality of symbols, pay tables, reel strip layouts, images, and/or other information to be used in games.

The term "processor" when described as part of, or existing within a game controller, may refer generically to any device that can process game play instructions in accordance with game play rules and may include: a microprocessor, microcontroller, programmable logic device, digital signal processors, graphics processors, and/or other computational device, a general-purpose computer (e.g., a PC) or a server. That is, a processor may be provided by any suitable logic circuitry for receiving inputs, processing the inputs in accordance with instructions stored in memory and generating outputs (for example, on the display). For example, a processor can process game play instructions, and generate outcomes, as described in Section III. Such processors may also be referred to as central processing units ("CPUs"). Most processors are general-purpose units, however, it is also known to provide a specific-purpose processor using, for example, an application-specific integrated circuit ("ASIC") or a field-programmable gate array ("FPGA"). Exemplary processors include the INTEL® PENTIUM® and the AMD® ATHLON® processors.

The term "control logic" may refer to a game controller or, more generally, one or more processors, operable to process game play instructions in accordance with game play rules, determine outcomes in accordance with game play rules, and generate outputs (e.g., to one or more display screens and/or speakers). For example, control logic can implement game play instructions, determine outcomes, and generate outputs as described in Section III. Depending on implementation, control logic can be implemented by software executable on a CPU, by software controlling special-purpose hardware (e.g., a GPU or other graphics hardware for video acceleration), or by special-purpose hardware (e.g., in an ASIC).

The term "application" or "program" may refer to software such as an operating system, device drivers, and/or appropriate user-mode instructions to provide functionality. The software can be stored in an associated memory device (example of a computer-readable medium). The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions for implementation of the processes of various embodiments. Thus, embodiments are not limited to any specific combination of hardware and software.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include dynamic random access memory ("DRAM"), which typically constitutes main memory. Statutory types of transmission media include coaxial cables, copper wire and fiber optics, including the wires that comprise a system bus coupled to the processor. Common forms of computer-readable media include, for example, a solid state drive, a flash drive, a secure digital ("SD") card, a compact flash ("CF") card, a floppy disk, a flexible disk, hard disk, magnetic tape, any other magnetic medium, a CD-ROM, Digital Versatile Disc ("DVD"), any other optical medium, punch cards, paper tape, any other physical medium with patterns of holes, RAM, programmable read-only memory ("PROM"), erasable programmable read-only memory ("EPROM"), FLASH-EEPROM, a USB memory stick, a dongle, any other memory chip or cartridge, or any other medium from which a computer can read. The terms "computer-readable memory" and/or "tangible media" specifically exclude signals, waves, and wave forms or other intangible or transitory media that may nevertheless be readable by a computer. The term "carrier wave" may refer to an electromagnetic wave modulated in amplitude or frequency to convey a signal. Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols.

The term "product" means any machine, manufacture and/or composition of matter as contemplated by 35 U.S.C. § 101, unless expressly specified otherwise.

The term "peripheral device" may refer to a device operatively connected (e.g., physically, wirelessly, and/or logically) to a gaming device (e.g., more specifically to a game controller within a gaming device) that is configured to assist in the operation of game, play, payout, wager and/or player tracking related functions. In some embodiments peripheral devices may be located near players at a table game.

The term "display," "screen," or "display screen" may refer to an area that conveys information to a viewer. The information may be dynamic, in which case, the display screen may use liquid crystal display ("LCD") technology, light-emitting diode ("LED") technology, cathode ray tube ("CRT") technology, digital light processing ("DLP") technology, rear projection technology, front projection technology, or some other display technology. The term "primary game screen," "main display" or "main display screen" may refer to a display screen or an area of a display screen used to display game information related to a primary game such as a video representation of one or more spinning reels. The term "secondary game screen" or "bonus display" may refer to a display screen or an area of a display screen used to display secondary game information such as animations and other graphics associated with a bonus game.

The term "slot machine" may refer to a gaming device or any mechanical, electrical or other device, contrivance or machine which, upon insertion of any monetary value in the form of a bill, a coin, ticket, token or similar object, or upon payment via electronic funds transfer ("EFT"), a mobile device, and/or a wireless device, or upon payment of any consideration, is available to play or operate, the play or operation of which, whether by reason of the skill of the operator in playing a gambling game which is presented for play by the machine or application of the element of chance, or both, may deliver or entitle the person playing or operating the machine to receive cash, premiums, merchandise, tokens, tickets, or anything of value, whether the payoff is made automatically from the machine or in any other manner.

The term "network" may refer to an energy delivery network or information network through which one or more computing devices may communicate with one another. Such devices may communicate directly or indirectly, via a wired or wireless medium such as the Internet, a local area network ("LAN"), wide area network ("WAN") or Ethernet (or IEEE 802.3), Token Ring, or via any appropriate communications means or combination of communications means. Exemplary communication protocols include but are not limited to: Bluetooth™, Time Division Multiple Access ("TDMA"), Code Division Multiple Access ("CDMA"), Global System for Mobile communications ("GSM"), Enhanced Data rates for GSM Evolution ("EDGE"), General Packet Radio Service ("GPRS"), Wideband CDMA ("WCDMA"), Advanced Mobile Phone System ("AMPS"), Digital AMPS ("D-AMPS"), IEEE 802.11 ("WI-FI"), IEEE 802.3, the best of breed ("BOB"), system to system ("S2S"), or the like. If video signals or large files are being sent over the network, a broadband network may be used to alleviate delays associated with the transfer of such large files, however, such is not strictly required. Each of the devices can be adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

II. Example Electronic Gaming Servers and Electronic Gaming Machines

Figure 1:
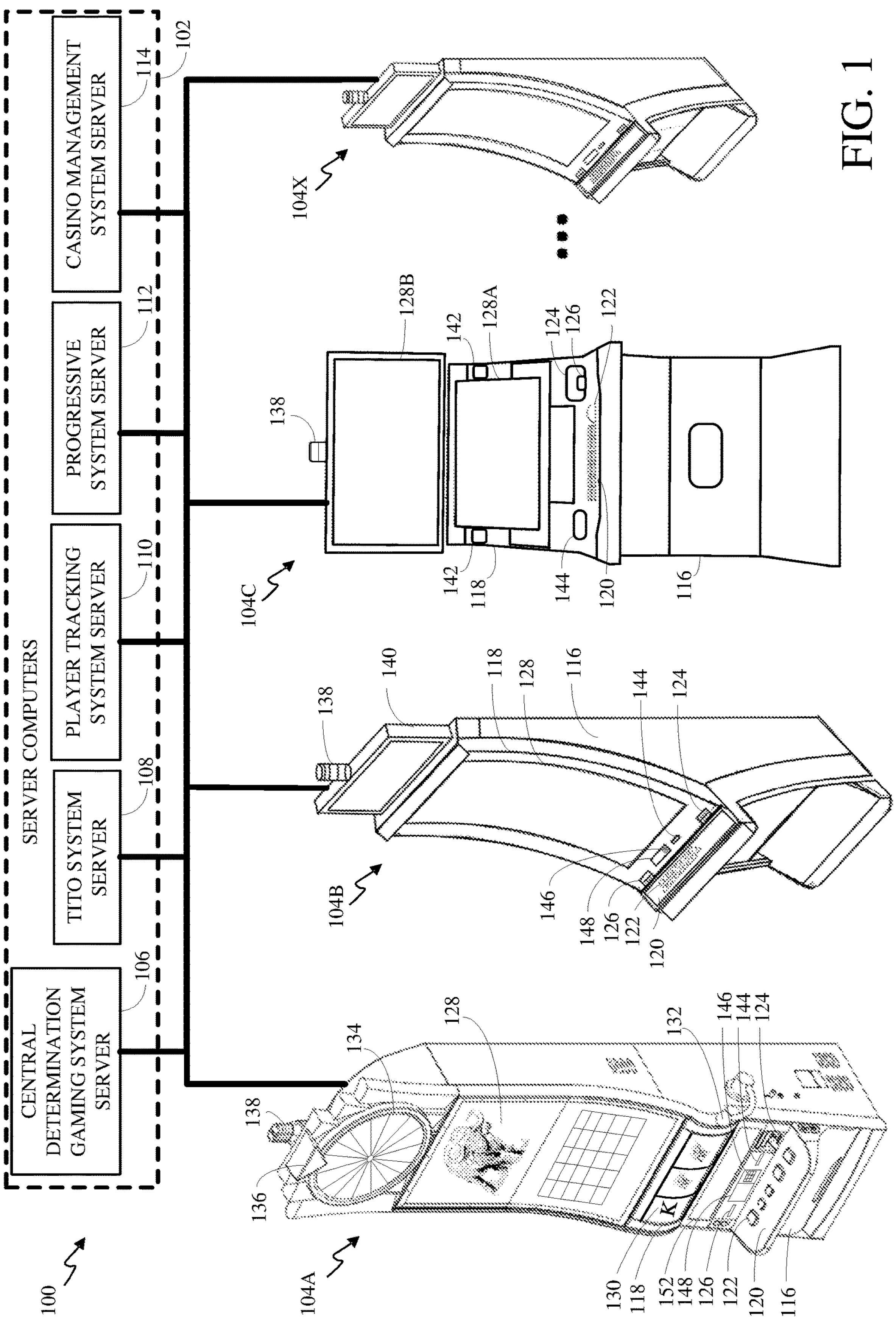
FIG. 1 is a perspective diagram of example EGMs according to some embodiments.

An example embodiment of the system 100 of the present invention is depicted in FIG. 1. The present invention can be configured to work as an electronic gaming system 100 in a network environment including one or more server computers 102 (e.g., slot servers of a casino) that are in communication, via a communications network, with one or more gaming devices 104A-X that have communication interfaces with the network. Server computers 102 may include, for example, a slot server in a casino, configured to communicate with gaming devices 104A-X, which may be configured as EGMs such as slot machines, video poker machines, etc. Server computers 102 may communicate with the gaming devices directly or indirectly, via a wired or wireless medium such as the Internet, Wi-Fi, Ethernet, other LAN or WAN protocols, or via any appropriate communications means or combination of communications means. Higher level communications protocols may be used to facilitate communications between server computers 102 and gaming devices 104A-X. Each of the gaming devices 104A-X may be an EGM that is configured to communicate with the server computers 102. Any number and type of gaming devices 104A-X may be in communication with the server computers 102.

Communication between the gaming devices 104A-X and the server computers 102, and among the gaming devices 104A-X, may be direct or indirect, such as over the Internet through a website maintained by computer on a remote server or over an online data network including commercial online service providers, Internet service providers, private networks, and the like. In yet other embodiments, the gaming devices 104A-X may communicate with one another and/or the server computers 102 over RF, cable TV, satellite links and the like.

Some, but not all, possible communication networks that may comprise the network or be otherwise part of the system 100 include: a LAN, a WAN, the Internet, a telephone line, a cable line, a radio channel, an optical communications line, and a satellite communications link. Example communications protocols that may be part of the system include: Ethernet (or IEEE 802.3), Session Announcement Protocol ("SAP"), Autonomous Transport Protocol ("ATP"), Bluetooth™, and Transmission Control Protocol/Internet Protocol ("TCP/IP"). In addition, session, presentation, and application layer protocols may also be employed. Communication may be encrypted to ensure privacy, provide security, and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time.

In some embodiments, server computers 102 may not be necessary and/or preferred. For example, the present invention may, in one or more embodiments, be practiced on a stand-alone gaming device such as gaming device 104A and/or a gaming device 104A in communication only with one or more other gaming devices 104B-X (i.e., without server computers 102). In such embodiments, any functions described as performed by the server computers 102 or data described as stored on the server computers 102 may instead be performed by or stored on one or more gaming devices 104A-X.

A. Example Server Computers

As discussed above, server computers 102 can include one or more servers that combine to form a casino management system, which manages one or more gaming devices 104A-X. Each of the servers includes at least one processor, memory, and a network interface, which enables communication over one or more networks between the server computers 102 and the gaming devices 104A-X. In general, the casino management system is configured to receive gaming data from the gaming devices 104A-X as the gaming devices 104A-X conduct rounds of play of one or more wagering games.

In some embodiments, the servers may be embodied as conventional slot servers that provide various gaming device monitoring and management functions. Examples of such systems are described in U.S. patent application Ser. No. 11/225,407, by Wolf et al., entitled "METHODS AND DEVICES FOR MANAGING GAMING NETWORKS" and filed Sep. 12, 2005, the disclosure of which is hereby incorporated by reference.

In other embodiments, the server computers 102 can include a central determination gaming system server 106, which may be called a gaming server. A central determination gaming system server 106 can be implemented as described in U.S. Pat. No. 8,932,129 by Powell et al., the disclosure of which is hereby incorporated by reference. Or, the central determination gaming system server 106 can have an architecture similar to one of the gaming devices 104A-X, as described with reference to FIG. 2. The central determination gaming system server 106 can perform multiple functions, such as game outcome generation.

Gaming devices 104A-X can include features to enable operation of the central determination gaming system server 106 for use by the player and operator (e.g., the casino). In such systems, a game outcome may be generated on the central determination gaming system 106, which is typically a host computer server. The game outcome is then transmitted over the network to any of a group of remote terminals or remote gaming devices 104A-X that utilize the game outcome and display the result to the player. The remote gaming devices 104A-X are connected to the central determination gaming system 106 via a network such as a LAN, a WAN, an intranet or the Internet. The remote gaming devices 104A-X may be portable gaming devices such as, but not limited to, a smartphone, a tablet, a laptop, a cell phone, a personal digital assistant, a personal computer, and a wireless game player. In some embodiments, images rendered from 3D gaming environments may be displayed on portable gaming devices that are used to play the game. Further the gaming devices 104A-X or the central determination gaming system 106 may include gaming logic (example of control logic) for commanding a remote gaming device to render an image from a virtual camera in 3D gaming environments stored on the remote gaming devices 104A-X and to display the rendered image on a display located on the remote gaming devices 104A-X. Thus, those of skill in the art will understand that embodiments of the present invention, as described below, can be deployed on most any gaming device currently available or hereafter developed.

The server computers 102 can also include a ticket-in-ticket-out ("TITO") system server 108 or accounting server.

A TITO system server 108 can be implemented as described in U.S. Pat. No. 6,048,269 by Burns et al., the disclosure of which is hereby incorporated by reference. Gaming devices 104A-X can include features to enable operation of the TITO system server 108 for use by the player and operator (e.g., the casino).

The server computers 102 can also include a player tracking system server 110. A player tracking system server 110 can be implemented as described in U.S. Pat. No. 6,142,876 by Cumbers, the disclosure of which is hereby incorporated by reference. Gaming devices 104A-X can include features to enable operation of the player tracking system server 110 for use by the player and operator (e.g., the casino). The player tracking system server 110 can perform various functions. For example, the player tracking system server 110 may track data of players using the gaming devices 104A-X. The player tracking system server 110 can store physical characteristics of players, such as gender and age. The player tracking system server 110 can also track and store other data related to the players using player tracking identification, such as a player card. For example, the player tracking system server 110 can store information about a player such as loyalty points, player address, phone number, and/or any information that may be retrieved and transmitted to the gaming devices 104A-X.

The server computers 102 can also include a progressive system server 112 or bonus server. A progressive system server 112 can be implemented as described in U.S. Patent Publication No. US 2006/0287077 by Gray et al., the disclosure of which is hereby incorporated by reference. Gaming devices 104A-X can include features to enable operation of the progressive system server 112 for use by the player and operator (e.g., the casino).

The server computers 102 can also include a casino management system server 114. A casino management system server 114 can be implemented as described in PCT Patent Publication No. WO 2005/02609A2 by Frerking et al., the disclosure of which is hereby incorporated by reference. Gaming devices 104A-X can include features to enable operation of the casino management system server 114 for use by the operator (e.g., the casino). The server computers 102 can also include a configuration workstation (not shown), which is coupled to the gaming devices 104A-X through the network.

FIG. 1 shows different servers that perform different sets of functions. Alternatively, one or more of the different servers shown in FIG. 1 can be combined.

B. Example Gaming Devices

Still referring to FIG. 1, the gaming devices 104A-C illustrated are specific exemplary embodiments of EGMs suitable for use with embodiments of the present invention, and the same or similar elements shown in gaming devices 104A-C may be included in any gaming device 104X, which is also suitable for use with embodiments of the present invention. More generally, an EGM may be any type of gaming machine and may include, without limitation, different structures than those shown in FIG. 1. For example, an EGM can be implemented using a personal computer, tablet computer, smartphone, personal digital assistant, or any other network-enabled device.

Details of an example gaming device 104A are now described in detail. The particular example gaming device 104A pictured in FIG. 1 is a Relm XL™ model gaming device manufactured by Aristocrat® Technologies, Inc. Gaming device 104A may include a main cabinet 116, which generally surrounds the device's interior (not shown) and is viewable by players. The main cabinet 116 provides a support structure for the example gaming device 104A and housing for components of the example gaming device 104A. The main cabinet 116 can include a main door 118 on the front of the gaming device 104A, which opens to provide access to the interior of the gaming device 104A. Main cabinet 116 typically includes a button area or button deck 120 accessible by a player that is configured with input switches or buttons 122, a bill validator 124 for accepting and/or validating cash bills, coupons, and/or ticket vouchers, a ticket-out printer 126 and a coin tray (not present in the example embodiment shown in FIG. 1). In some embodiments, a coin-in slot may also be provided for accepting coins and/or tokens.

The input switches or buttons 122, along with other input devices, provide at least part of a player interface through which a player controls operation of a game. For example, buttons 122 may be used to start play of a primary game or secondary game. One button may be a "Bet One" button that enables the player to place a bet or to increase a bet. Another button may be a "Bet Max" button that enables the player to bet a maximum permitted wager. Yet another button may be a "Cash Out" button that enables the player to receive a cash payment or other suitable form of payment, such as a ticket or voucher that corresponds to a number of remaining credits. Alternatively, instead of having separate buttons that can be actuated physically, one or more of the buttons 122 can be presented on a touch screen.

The main cabinet provides structural support for the main display 128. In many configurations, a main display 128 (e.g., video display monitor) is mounted to, or above, the main door 118. The main display 128 can be a high-resolution LCD, plasma, LED, OLED, or SED panel, which may be flat or curved as shown, a cathode ray tube, or other conventional electronically-controlled video monitor. Alternatively, the main display 128 can be a touch screen display. Bill validator 124, player-input buttons 122 and main display 128 are interface components used to play a game on the gaming device 104A.

In some embodiments, the bill validator 124 may also function as a "ticket-in" reader that allows the player to use a casino-issued credit ticket to load credit onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless ticket systems can be used to generate and track unique bar-codes that are printed on tickets to allow players to avoid the use of bills and coins for loading credits, instead using a ticket reader and cashing out credits through the use of ticket-out printer 126 on the gaming device 104A. Alternatively, the gaming device 104A can include some other type of credit input device. For example, the gaming device 104A can include a card reader or validator for use with credit cards, debit cards, identification cards, and/or smart cards. Cards accepted by the card reader or validator may include a magnetic strip and/or a preprogrammed microchip that includes a player's identification, credit totals, and any other relevant information that may be used. The credit input device may include a credit input module that interfaces with a server to accept credit and wagers.

In some embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within the gaming device 104A can communicate with the player tracking server system 110 to send and receive player tracking information.

Figure 2:
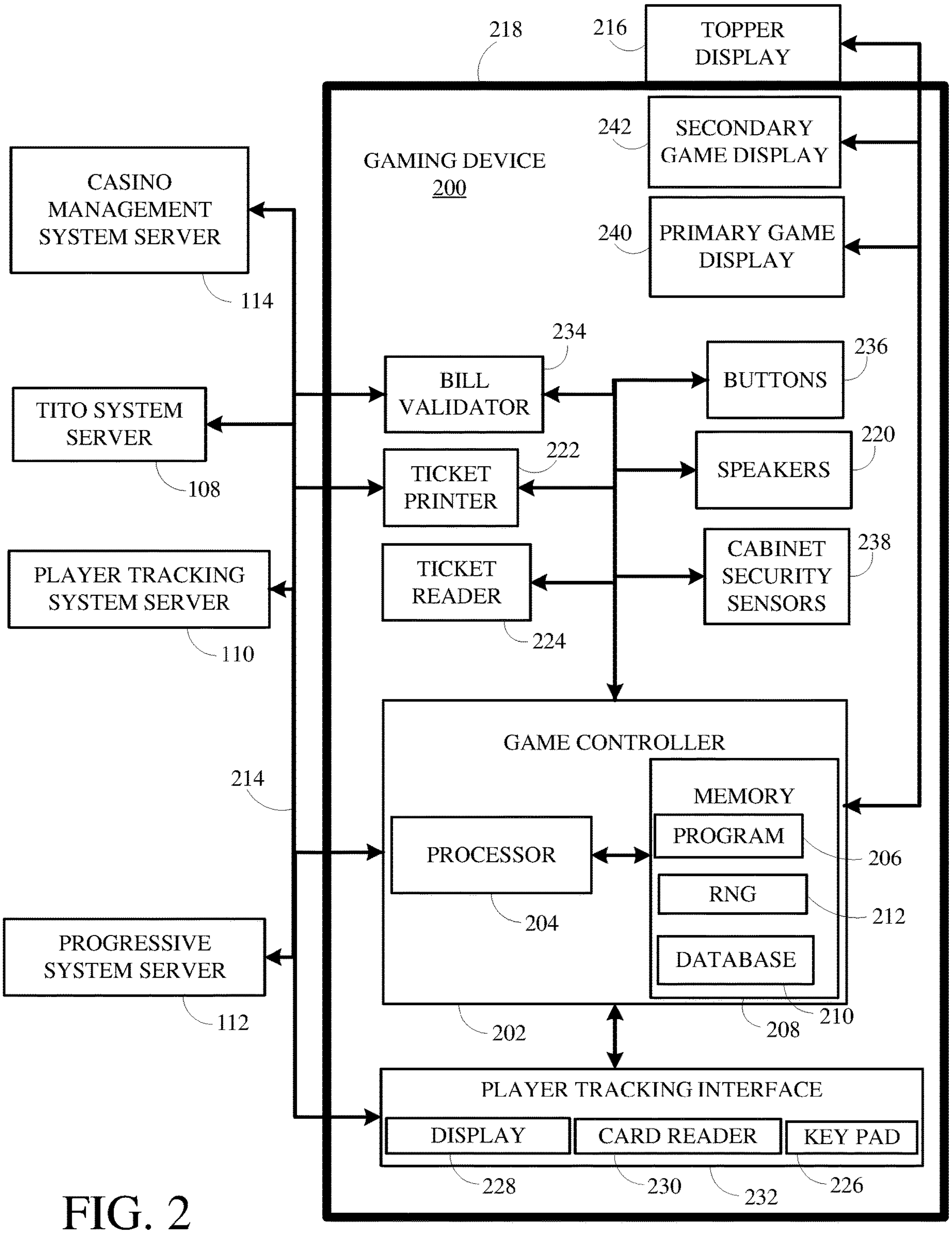
FIG. 2 is a block diagram illustrating an example of a networked EGM according to some embodiments.

Gaming device 104A may also include physical spinning reels 130 and a handle 132 that is typically mounted to the side of main cabinet 116 and may be used to initiate game play. Many or all of the above described components can be controlled by circuitry (e.g., a game controller) housed inside the main cabinet 116 of the gaming device 104A, the details of which are shown in FIG. 2.

In the example gaming device 104A configuration shown in FIG. 1, a bonus topper wheel 134 is included. When bonus play is triggered (e.g., by a player achieving a particular outcome or set of outcomes in the primary game), bonus topper wheel 134 is operative to spin and stop with indicator arrow 136 indicating the outcome of the bonus wheel game. Bonus topper wheel 134 is typically used to play a bonus game, but it could also be incorporated into play of the base or primary game. A candle 138 may be mounted on the top of gaming device 104A and may be activated by a player (e.g., using a switch or one of buttons 122) to indicate to operations staff that gaming device 104A has experienced a malfunction or the player requires service.

An information panel 152 may be a back-lit, silkscreened glass panel with lettering to indicate general game information including, for example, a game denomination (e.g., \$0.25 or \$1). In some embodiments, the information panel 152 may be implemented as an additional display screen.

Note that not all gaming devices suitable for implementing embodiments of the present invention necessarily include top wheels, top boxes, information panels, cashless ticket systems, and/or player tracking systems. Further, some suitable gaming devices have only a single game display that includes only a set of reels and/or a display screen, while others are designed for bar tables or table tops and have displays that face upwards. The example gaming device 104A can be positioned on a base or stand. While the example gaming devices 104A-C shown in FIG. 1 are configured for operation by a sitting player in front the gaming device, an EGM can instead be configured for operation by a sitting player at a table or a standing player.

An alternative example embodiment of a gaming device 104B is also illustrated in FIG. 1. The particular example depicted is the Arc™ model gaming device manufactured by Aristocrat® Technologies, Inc. Where possible, reference numerals identifying similar features of the gaming device 104A embodiment are used to identify corresponding features of the gaming device 104B.

Example gaming device 104B may include a main cabinet 116 including a main door 118, which opens to provide access to the interior of the gaming device 104B. The main cabinet 116 includes a button deck 120 with buttons 122, a bill validator 124, and a ticket-out printer 126. A main display 128 (e.g., display screen monitor) is mounted to, on, or above, the main door 118. The main display 128 can be a high-resolution LCD, plasma, LED, OLED, or SED panel, which may be in a portrait orientation with curvature radius from top to bottom as shown. Alternatively, the main display 128 can be a touchscreen display. The bill validator 124 may also function as a "ticket-in" reader for cashless play. A player tracking card reader 144, a transceiver for wireless communication with a player's smartphone, a keypad 146, and/or an illuminated display 148 for reading, receiving, entering, and/or displaying player tracking information is also provided.

Note that gaming device 104B does not include physical reels and instead shows game play functions on main display 128. An optional topper screen 140 may be used as a secondary game display for bonus play, to show game features or attraction activities while the game is not in play, or to show any other information or media desired by the game designer or operator. In some embodiments, topper screen 140 may also or alternatively be used to display progressive jackpot prizes available to a player during play of gaming device 104B.

Another alternative example embodiment of a gaming device 104C is also shown in FIG. 1. The pictured embodiment is a Helix™ model gaming device manufactured by Aristocrat® Technologies, Inc. Where possible, reference numerals identifying similar features of the embodiments of gaming devices 104A and 104B are used to identify corresponding features of gaming device 104C.

Example gaming device 104C may include a main cabinet 116 including a main door 118, which opens to provide access to the interior of the gaming device 104C. The main cabinet 116 includes a button deck 120 with buttons 122, a bill validator 124, and a ticket-out printer 126. A main display 128A (e.g., display screen monitor) is mounted to, on, or above, the main door 118. The main display 128A can be a high-resolution LCD, plasma, LED, OLED, or SED panel, which may be in a landscape orientation with curvature radius from top to bottom. Alternatively, the main display 128A can be a touchscreen display. The bill validator 124 may also function as a "ticket-in" reader for cashless play. The gaming device 104C includes a sound system (e.g., speakers 142) for playing game sound effects and music to enhance the player's game play experience. A player tracking card reader 144 and/or a transceiver for wireless communication with a player's smartphone for reading and/or receiving player tracking information is also provided.

Note that gaming device 104C includes a main display 128A that is in a landscape orientation. Although not illustrated by the front view provided, the landscape display 128A has a curvature radius from top to bottom. In some embodiments, display 128A can be a flat panel display. Gaming device 104C does not include physical reels and instead shows game play functions on main display 128A and a secondary display 128B. The secondary display 128B can be a high-resolution LCD, plasma, LED, OLED, or SED panel, which may be in a landscape orientation with curvature radius from top to bottom, or may be flat. A mounting bezel can divide the main display 128A from the secondary display 128B. Main display 128A is typically used for primary game play while secondary display 128B is typically used for bonus game play, to show game features or attraction activities while the game is not in play, or to show any other information or media desired by the game designer or operator.

The example gaming devices 104A-C shown in FIG. 1 show three different configurations of display screens. In general, a gaming device includes a main display 128, 128A. In many configurations, a gaming device also includes a secondary display 128B above, below, or to one side of the main display 128, 128A. A gaming device may include one or more other display screens, in addition to the main display 128, 128A and secondary display 128B, for displaying a secondary or bonus game, credit balances, wager amounts, cumulative wagering information, payout amounts, RTP information, casino-wide information, player points, or comp data. Such additional display screens may be of any suitable size and configuration (e.g., circular or rectangular) and may further include a haptic feedback mechanism.

Typically, the main display 128, 128A displays a wagering game and/or accepts game play data from a player. The main display 128, 128A may also display information relating to an interactive game, a wager-triggering event, or a wagering outcome. The secondary display 128B may, for example, display digital signage such as advertisements for one or more games or other aspects of the gaming establishment or casino. The secondary display 128B may be further configured to display wagering outcomes, secondary game data associated with or unassociated with the interactive wagering game displayed on main display 128, 128A, and any information relating to such interactive wagering games. The secondary display 128B may be further configured to receive inputs and commands from the player. In some configurations, the secondary display 128B includes a credit or fund display that displays the player's current credit balance, cash accumulated, account balance, an original number of credits input to the gaming device, or any other credit- or wager-related information. The secondary display 128B can also display a wager amount for a current round of play. The secondary display 128B may be further configured to display the player's winnings and bonus awards for the current round of play, as well as accumulated winnings and/or bonus awards.

For a game, the main display 128, 128A is configured to display at least one game or game image, game symbol or symbols, and other game indicia such as visual representations or exhibitions of movement of objects. Depending on the game, the main display 128, 128A may display, for example, virtual, or video, reels and wheels, dynamic lighting, video images, images of people, characters, places, things, and faces of cards. The symbols, images, and indicia are displayed electronically, or virtually, on the main display 128, 128A. Alternatively, symbols, images, and indicia can be displayed mechanically on one or more reels. Such mechanical reels can be part of an electromechanical device, and may provide one or more rotatable or spinning wheels, reels, or dice, any of which may be configurable to display one or more games, images, symbols, or indicia.

Many different types of games, including mechanical slot games, video slot games, video poker, video black jack, video pachinko, keno, bingo, and lottery, may be provided with or implemented within the depicted gaming devices 104A-C and other gaming devices. In particular, a gaming device may be operable to provide play of many different instances of games of chance. The instances may be differentiated according to themes, sounds, graphics, type of game (e.g., slot game vs. card game vs. game with aspects of skill), denomination, number of pay lines, maximum jackpot, progressive or non-progressive, bonus games, Class 2 or Class 3, etc.

A gaming device suitable for implementing the present invention may be operable to allow a player to select a game of chance, skill, or combination thereof, to play from a plurality of instances available on the gaming device. For example, a gaming device may provide a menu with a list of the instances of games that are available for play on the gaming device, and a player may be able to select from the list a first instance of a game that they wish to play.

C. Example Components of Gaming Device

Turning now to FIG. 2, a block diagram depicting an example of the components of a gaming device 200 connected to external systems is shown. All or parts of the example gaming device 200 shown could be used to implement any one of the example gaming devices 104A-X depicted in FIG. 1.

One or more instances of wagering games available for play on the gaming device 200 are controlled by a game controller 202. In general, the game controller 202 conducts a wagering game, generates gaming data (e.g., for wagers, game outcomes, payouts, player ratings, duration of play, and time between rounds of play), and, for each round of play of the wagering game, awards a payout or win amount according to a pay table. A base game can include a bonus game that the game controller 202 also conducts. In some example implementations, the game controller 202 processes game play instructions to perform the following operations. The game controller 202 detects the appearance of one or more special symbol stacks that appear in the reel area for reels during a base reel game. The game controller 202 also determines whether any win conditions exist (on pay lines) and awards win amounts to the player. When the game controller 202 detects a special symbol stack in the reel area for a given reel, the game controller 202 initiates reconfiguration of the reels of the base reel game and initiates an instance of the bonus reel game. The game controller 202 determines respective quantities of special symbols and special symbol stacks that populate reels during the bonus reel game. The game controller 202 may determine the quantities of special symbols and special symbol stacks based on the value of the wager placed by the player during the base reel game. During the bonus reel game, the game controller 202 locks certain reels and spins the remaining reels. In particular, the game controller 202 locks any reels with full stacks of special symbols, and spins any remaining reels. The game controller 202 further detects additional occurrences of special symbol stacks in the remaining reels, and awards re-spins accordingly. When the bonus reel game ends (e.g., because there are no new reels with special symbol stacks, or because all reels have special symbol stacks), the game controller 202 determines which jackpot award should be awarded based on the quantity of special symbol stacks appearing in the reel area for the reels. More generally, the game controller 202 can process game play instructions and generate outcomes as described in Section III.

The game controller 202 includes one or more processors 204 as well as a game that may be stored as a program 206 (software) in memory 208 coupled to the processor 204. The processor 204 may be programmed by encoding an operation as one or more executable instructions and providing the executable instructions in the memory 208. The processor 204 may be, for example, a microprocessor, a microcontroller-based platform, a suitable integrated circuit, and/or one or more ASICS.

The memory 208 may include one or more mass storage devices or media that are housed within gaming device 200. Alternatively, data and computer-executable instructions may be stored in a cloud service, a database, or other non-transitory memory accessible by the gaming device 200. This can reduce the computational and storage burden on the gaming device 200. As such, memory 208 may be a local and/or a remote computer storage media including memory storage devices. Moreover, memory 208 may include one or more forms of memory. For example, memory 208 can include RAM, ROM, flash memory, and/or EEPROM. Other suitable magnetic, optical, and/or semiconductor-based memory may be included in memory 208 by itself or in combination. Within the mass storage devices and/or memory 208, one or more databases 210 may be provided for use by the program 206. As part of the memory 208, the game controller 202 can track and record gaming data in a meter (e.g., amounts wagered at the gaming device 200)). In some example implementations, the memory 208 is a physical storage device, such as a cartridge that is removable from the gaming device 200. The memory 208 can include multiple removable physical storage devices, each configured to store certain executable program modules. Alternatively, the memory 208 includes multiple partitions of a single physical storage device, each partition configured to store certain executable program modules.

A random number generator ("RNG") 212 can be implemented in hardware and/or software. The RNG 212 can be integrated into the game controller 202 or processor 204. The RNG 212 is configured to be secure from unauthorized access, manipulation, or compromise. Generally, an output of the RNG 212 is the basis on which game outcomes are determined by the game controller 202. The output of the RNG 212 can include a random number or pseudo random number (either is generally referred to as a "random number").

The RNG 212 is typically used to generate random numbers that are used in the operation of game play to ensure that game play outcomes are random and meet regulations for a game of chance. Alternatively, a game instance may be generated on a remote gaming device such as a central determination gaming system server 106 (not shown in FIG. 2, but see FIG. 1). Output for the game instance is communicated to gaming device 200 via the network 214 and then displayed on gaming device 200. Gaming device 200 may execute game software, such as but not limited to video streaming software that allows the game to be displayed on gaming device 200. When an instance of a game is stored on gaming device 200, it may be loaded from memory 208 (e.g., from a ROM) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.), which sits on top of main cabinet 218. In addition to the components described above, either gaming cabinet 218 or topper display 216 may also house a number of other components which may be used to add features to a game being played on gaming device 200, including speakers 220, a ticket printer 222 that prints bar-coded tickets, and a ticket reader 224 that reads bar-coded tickets. Ticket printer 222 may be used to print tickets for a TITO system server 108. As indicated above with respect to the gaming devices 104A-104X of FIG. 1, the gaming device 200 can further include a bill validator 234, coin acceptor, ticket reader 224, card reader, or other credit input device. The credit input device can include an interface to a server, which is configured to accept credits to establish a credit balance at the gaming device 200. The gaming device includes buttons 236 for player input, as well as cabinet security sensors 238 to detect unauthorized opening of the cabinet 218. For player tracking, the gaming device 200 can include a keypad 226 for entering player tracking information, a player tracking display 228 for displaying player tracking information (e.g., an illuminated or display screen), and a card reader 230 for receiving data and/or communicating information to and from media or a device such as a smartphone. Some or all of these components collectively may be referred to as a player tracking interface 232.

The gaming device 200 includes several display screens, each coupled to and operable under the control of the game controller 202. A primary game display 240 acts as a main display 128, 128A as described with reference to FIG. 1. A secondary game display 242 acts as a secondary display 128B as described with reference to FIG. 1. The gaming device 200 can include a credit display that displays a player's current number of credits, cash, account balance, or the equivalent. The gaming device 200 can also include a bet display that displays a player's amount wagered. The credit display and/or bet display may be standalone displays, independent of the primary game display 240 and secondary game display 242. Alternatively, the credit display and/or bet display can be incorporated into the primary game display 240 or secondary game display 242. Any of the display screens can be implemented as a touch screen, with an associated touch screen controller. In this case, such display screens may be operated as input devices in addition to presenting information, to provide input game play decisions (e.g., actions on and selection of game presentation objects).

The game controller 202 can communicate over a network with one or more other gaming devices or other devices via a communication interface. The communication interface may operate as an input device (e.g., by receiving data from another device) and/or as an output device (e.g., by transmitting data to another device). The gaming device 200 can also include one or more communication ports that enable the game controller 202 to communicate with peripheral devices, external video sources, expansion buses, or display screens.

Gaming device 200 may be connected over the network 214 to a player tracking system server 110. Player tracking system server 110 may be, for example, an OASIS® system manufactured by Aristocrat® Technologies, Inc. Player tracking system server 110 is used to track play for individual players so that an operator may reward players in a loyalty program. A player uses the player tracking interface 232 that includes player tracking keypad 226, player tracking display 228 and card reader 230, which is typically housed within cabinet 218. Details of example player tracking systems can be found in Patent Pub. No. US 2009/0054139 A1, the disclosure of which is hereby incorporated by reference.

When games are implemented in an online environment, at least a portion of the game software can be stored in a remote game server or in a cloud computing service. Game transactions such as adding money to the game (i.e., cash in) and withdrawing money from the game (i.e., cash out) are substituted by implementing electronic fund transfers. A player deposits money into his online gaming account via checks, debit cards, wire and the like. Once funded, the player can move a portion of the cash in his account into the game he wants to play. This process is referred to as account-based wagering. Account-based wagering is a convenient monetary transaction system for online and mobile wagering environments since the physical bill acceptor and ticket printer are not available. In addition to the accounting meters' separation, the detection of the location where the wagering transaction take place is also performed in order to enforce local gaming regulations and properly calculate revenue, profit, and tax withholdings, for example. Thus, a remote gaming device can access a casino via a computer network and participate in a game of chance. The remote gaming device may be a PC, smartphone, or other computing device coupled to the Internet via a wired or wireless link (and, e.g., connecting to a casino management system via a virtual private network). The remote gaming device may be a terminal-based machine, where the actual game (including RNG and outcome determination) is hosted at a gaming server, with the terminal-based machine displaying results of the game via one or more display screens.

Returning now to the example of FIG. 2, when a user wishes to play the gaming device 200, he can insert cash through a coin acceptor (not shown) or bill validator 234. Alternatively, bill validator may include ticket reader 224, enabling the acceptance of a printed ticket voucher, which may be accepted as an indicia of credit when a cashless TITO system server 108 is used. At the start of the game, the player may enter playing tracking information using card reader 230, keypad 226, and the display 228. Further, other game preferences of the player playing the game may be read from a card inserted into the card reader 230. During the game, the player views game information using game displays 240, 242. Other game and prize information may also be displayed on topper display 216.

During the course of a game, a player may be required to make a number of decisions, which affect the outcome of the game. For example, a player may vary his or her wager on a particular base reel game (which affects the bet level and hence the likelihood of special symbol stacks, the likelihood of triggering the bonus reel game, the likelihood of reaching higher award amounts of the progressive jackpot, etc.), select a prize for a particular game selected from a prize server, or make game decisions which affect the outcome of a particular game. The player may make these choices using the player-input buttons 236, the primary game display 240 which may be a touch screen, or using some other device which enables a player to input information into the gaming device 200. In some embodiments, the player may be able to access various game services such as concierge services and entertainment content services using the primary game display 240 and one or more input devices.

During certain game events, the gaming device 200 may display visual and auditory effects that can be perceived by the player. These effects add to the excitement of a game, which makes a player more likely to continue playing. Auditory effects include various sounds that are projected by the speakers 220. Visual effects include flashing lights, strobing lights or other patterns displayed from lights on the gaming device 200 or from lights behind the information panel 152 (FIG. 1). After the player has completed a game, the player may receive game credits, game tokens from the coin tray (not shown), or a ticket from ticket printer 222, which may be used for further games or to redeem a prize. Further, the player may receive a ticket for food, merchandise, or games from the ticket printer 222.

Those of skill in the art will appreciate that embodiments of the present invention could be implemented with more or fewer elements than are depicted in FIG. 2. For example, player tracking system server 110 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by a casino management system.

Note that the pictured example embodiments of a gaming device 200, as well as example gaming devices 104A-C, are merely a few examples from a wide range of possible gaming device designs on which embodiments of the present invention may be implemented. Depending on implementation and the type of processing desired, components of the gaming device 200 can be added, omitted, split into multiple components, combined with other components, and/or replaced with like components. In alternative embodiments, gaming devices with different components and/or other configurations of components perform one or more of the described techniques. Specific embodiments of gaming devices typically use a variation or supplemented version of the gaming device 200. The relationships shown between components within the gaming device 200 indicate general flows of information in the gaming device 200; other relationships are not shown for the sake of simplicity. In general, the game controller 202 can be implemented by software executable on a CPU, by software controlling special-purpose hardware, or by special-purpose hardware (e.g., in an ASIC).

D. Specialized Features of Example Gaming Devices and Servers

Gaming devices such as gaming device 200 (as a generalized example of devices 104A-X) typically include special features and/or additional circuitry that differentiates them from general-purpose computers (e.g., desktop computers and laptops). Gaming devices such as gaming device 200 are highly regulated to ensure fairness and, in many cases, are operable to dispense monetary awards (e.g., in the form of a redeemable voucher) of multiple millions of dollars. Therefore, to satisfy security and regulatory requirements in a gaming environment, hardware and software architectures are implemented in gaming devices that differ significantly from those of general-purpose computers. A description of gaming devices relative to general-purpose computing machines and some examples of the additional (or different) components and features found in gaming devices are described below.

Ostensibly, it may superficially seem that adapting general-purpose computers to gaming industry applications (i.e., as gaming devices) would be a relatively straightforward proposition because both general-purpose computers and gaming devices 200 use processors coupled to a memory to execute stored instructions to receive input, display output, and to control a variety of peripheral devices. However, because of 1) the regulatory requirements for gaming devices 200, 2) the harsh environment in which gaming devices 200 operate, 3) security requirements, and 4) fault tolerance requirements, adapting general-purpose computers to function as gaming devices 200 is not simple or straightforward, requires substantial engineering effort, and requires additional hardware not typically found in general-purpose computers. Further, techniques and methods for solving a problem in the PC industry, such as device compatibility and connectivity issues, are typically not adequate in the gaming environment. For instance, a fault or a weakness tolerated in a PC, such as security holes in software or relatively frequent crashes, may not be tolerated in a gaming device 200 because in a gaming device 200 these faults can lead to a direct loss of funds from the gaming device 200, such as stolen cash or loss of revenue when the gaming device 200 is not operating properly.

To illustrate that gaming devices 200 are specially-configured gaming hardware and not merely general-purpose computers, a few examples of the specialized hardware configuration, as well as differences between PC systems and gaming devices 200, are provided. A first difference between a gaming device 200 and common processor-based computer system is that gaming device 200 is designed to be a state-based system. In a state-based system, the system stores and maintains its current state in non-volatile memory, which can be implemented using battery-backed RAM, flash memory, a solid-state drive, or other persistent memory. In the event of a power failure or other malfunction, the gaming device 200 will return to its current state when the power is restored by recovering state information from non-volatile memory. For instance, if a player was shown an award for a game of chance and, before the award could be provided to the player, the power failed, the gaming device 200, upon the restoration of power, would return to the state where the award is indicated. More generally, the gaming device 200 records, in non-volatile memory, the values of game parameters assigned during play, such as variables determined by a random number generator or internal counters. The value of a game parameter can be recorded periodically, in response to some event such as user input, or whenever the value of the game parameter changes. This way, the gaming device 200 can recover its state in case of a power failure or "tilt" event, allowing the gaming device 200 to reconstruct events that have taken place before the power failure or "tilt" event. In contrast, PCs are not state machines to the same extent, and a majority of data is usually lost when a malfunction occurs. This requirement affects the software and hardware design on a gaming device 200.

In the context of the innovations described herein, for example, when a game controller 202 of a gaming device 200 manages operations for special symbol stacking of reels (e.g., as described with reference to FIG. 5 or FIG. 7), the game controller 202 can save information about state in non-volatile memory at various stages. After starting a process that uses reels on a display screen of the gaming device 200, the game controller 202 can save information in non-volatile memory that indicates a default configuration of the reels. At this time, the non-volatile memory can also store other state information, such as a current bet amount, control level (e.g., current bet level), an amount of credits remaining, and/or a win amount for a base game. After using the control level (e.g., current bet level) and a random number generator to determine a likelihood of a special symbol type, the game controller 202 can save information in non-volatile memory that indicates the determined likelihood of the special symbol type. After selectively populating or re-populating reel strips of the reels with symbols of the special symbol type and symbols of one or more other symbol types, the game controller 202 can save information in non-volatile memory that indicates the new configuration of the reels.

As another example in the context of the innovations described herein, when a game controller 202 of a gaming device 200 manages operations for an iterative re-spin process (e.g., as described with reference to FIG. 5 or FIG. 7), the game controller 202 can save information about state in non-volatile memory at various stages. As part of the iterative re-spin process, non-volatile memory can store state information such as positions of the respective reels, a count of special symbol stacks enclosed in a reel area, and/or lock states for the respective reels, in addition to storing information that indicates the configuration of reel strips of the reels. After each spin of the iterative re-spin process, the game controller 202 can update the values in non-volatile memory that indicate the positions of the respective reels, the count of special symbol stacks enclosed in the reel area, and/or the lock states for the respective reels. State information in non-volatile memory can even be updated in a more fine-grained way, e.g., for each reel of a spin, after that reel lands in the reel area. After exiting the iterative re-spin process, the game controller 202 can store information in non-volatile memory that indicates the count of special symbol stacks enclosed in the reel area and/or an outcome of the iterative re-spin process (e.g., award amount).

A second significant difference between gaming devices 200 and common PC-based computer systems is that, for gaming regulation purposes, the software on the gaming device 200 used to generate the game of chance and operate the gaming device 200 has been designed to be static and monolithic (i.e., immutable) to prevent cheating by the user of gaming device 200. For instance, one solution that has been employed in the gaming industry to prevent cheating and satisfy regulatory requirements has been to manufacture a gaming device 200 that can use a proprietary processor running instructions to generate the game of chance from an EPROM or other form of non-volatile memory. The executable instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the game controller to operate a device during generation of the game of chance can require a new EPROM to be produced, approved by the gaming jurisdiction, and reinstalled on the gaming device 200 under the supervision of a gaming regulator. Regardless of whether the EPROM solution is used, to gain approval in most gaming jurisdictions, a gaming device 200 must demonstrate sufficient safeguards that prevent an operator or player of a gaming device 200 from manipulating hardware and software in a manner that gives them an unfair, and in some cases illegal, advantage.

Further, the gaming device 200 typically includes a means to determine if the code it will execute is valid. If the code is not valid, the gaming device 200 must have a means to prevent the code from being executed. The code validation requirements in the gaming industry affect both hardware and software designs on gaming devices 200.

Even further, a significant difference between gaming devices 200 and common PC-based computer systems is the use of a highly sophisticated RNG that is required to be approved to meet strict regulations that prove that outcomes will be statistically independent, uniformly distributed over their range, unpredictable and pass statistical tests such as chi-square test, equi-distribution test, gap test, runs test, serial correlation test, etc. Further, calculation and validation of the return to player percentage is impacted by the RNG. Published standards defining tests specified in the regulations of various jurisdictions are developed by organizations such as Gaming Laboratories International LLC ("GLI"). Consequently, operation of gaming devices 200 involve a mathematical component as well as devices that are not relevant or present in common PC-based computer systems.

A third significant difference between gaming devices 200 and common PC-based computer systems is that the number and kinds of peripheral devices used on a gaming device 200 are not as widely varying as on PC-based computer systems. Typically, in the gaming industry, gaming devices 200 (as compared to PCs) have been relatively restricted in the functionality and peripherals used, in that the number of peripheral devices and the number of functions of the gaming device 200 is limited. Further, in operation, the functionality of gaming devices 200 are relatively constant once the gaming device 200 is deployed, i.e., new peripherals devices and new gaming software are infrequently added to a deployed gaming device 200. This differs from a PC, where users will continually use different combinations of peripheral devices and software from different manufacturers and connect them to their PCs to suit their needs depending on a desired application. Therefore, the types of peripheral devices connected to a PC may vary greatly from user to user depending in their individual requirements and may vary significantly over time.

Although the variety of peripheral devices available for a PC may be greater than on a gaming device 200, gaming devices 200 still have unique device requirements that differ from a PC, such as device security requirements not usually addressed by PCs. For instance, monetary devices, such as coin dispensers, bill validators and ticket printers, and computing devices that are used to govern the input and output of cash to a gaming device 200 have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming devices 200 that are not typically found in general-purpose computing devices such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming devices 200 to provide a software failure detection mechanism. In contrast to a general-purpose operating system, the operating software of a gaming device periodically accesses control registers in the watchdog timer subsystem to "re-trigger" the watchdog. Should the gaming device operating software fail to access the control registers within a preset timeframe, the watchdog timer will timeout and generate a system reset. Typical watchdog timer circuits for gaming devices contain a loadable timeout counter register to allow the operating software to set the timeout interval within a certain range of time. A differentiating feature of some gaming device circuits is that the operating software cannot completely disable the function of the watchdog timer. In other words, the watchdog timer always functions (from the time power is applied to the gaming device 200 board).

Gaming device 200 platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming device 200. Gaming devices 200 typically have power supplies with tighter voltage margins than that required by the operating circuitry. In addition, the voltage monitoring circuitry implemented in gaming devices 200 typically has two thresholds of control. The first threshold generates a software event that can be detected by the operating software, and an error condition is generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device 200.

As mentioned above, the standard method of operation for gaming device software is to use a state machine. Different functions of the game (e.g., bet, play, result, points in the graphical presentation, etc.) may be defined as a state. When a game moves from one state to another, critical data regarding the game state is stored in a custom non-volatile memory subsystem. This is critical to ensure the player's wager and credits are preserved and to minimize potential disputes in the event of a malfunction on the gaming device 200. Examples of state information saved in non-volatile memory by a game controller 202, in the context of innovations described herein, are described above.

In general, unlike typical general-purpose computers, the gaming device 200 does not advance from a current state to a subsequent state until critical information that allows the current state to be reconstructed is stored. This feature allows the game to recover operation to the current state of play in the event of a malfunction, loss of power, etc. that occurred just prior to the malfunction. After the state of the gaming device 200 is restored during the play of a game of chance, game play may resume and the game may be completed in a manner that is no different than if the malfunction had not occurred. Typically, battery-backed RAM devices are used to preserve this critical data although other types of non-volatile memory devices may be employed. These memory devices are not normally present in typical general-purpose computers, and if present, are not used in this manner.

As described in the preceding paragraph, when a malfunction occurs during a game of chance, the gaming device 200 may be restored to a state in the game of chance just prior to when the malfunction occurred. The restored state may include metering information and graphical information that was displayed on the gaming device 200 in the state prior to the malfunction. For example, when the malfunction occurs during the play of a card game after the cards have been dealt, the gaming device 200 may be restored with the cards that were previously displayed as part of the card game. As another example, a bonus game may be triggered during the play of a game of chance, where a player is required to make a number of selections on a display screen. When a malfunction occurs after the player has made one or more selections, the gaming device 200 may be restored to a state that shows the graphical presentation at the moment just prior to the malfunction, including an indication of selections that have already been made by the player. In general, the gaming device 200 may be restored to any state in a plurality of states that occur in the game of chance while the game of chance is played or to states that occur between plays of the game.

Game history information regarding previous games played, such as an amount wagered, the outcome of the game and so forth, may also be stored in a non-volatile memory device. The information stored in the non-volatile memory may be detailed enough to reconstruct all or a portion of the graphical presentation that was previously presented on the gaming device 200 and the state of the gaming device 200 (e.g., credits) at the time the game of chance was played. The game history information may be utilized in the event of a dispute. For example, a player may decide that, in a previous game of chance, the player did not receive credit for an award that the player believed to be won. The game history information may be used to reconstruct the state of the gaming device 200 prior, during and/or after the disputed game to demonstrate whether the player was correct or not in that assertion.

Another feature of gaming devices 200, such as gaming devices 104A-X, is that they often contain unique interfaces, including serial interfaces, to connect to specific subsystems internal and external to the gaming devices. The serial devices may have electrical interface requirements that differ from the "standard" EIA 146 serial interfaces provided by general-purpose computers. These interfaces may include the Electronic Industries Alliance's EIA-485 standard, EIA-422 standard, fiber optic, optically coupled serial interfaces, current loop style serial interfaces, etc. In addition, to minimize the required number of serial interfaces internally in the gaming device, serial devices may be connected in a shared, bus, and/or daisy-chain fashion, where multiple peripheral devices are connected to a single serial (or other protocol) channel. The serial interfaces may be used to transmit information using communication protocols that are unique to the gaming industry. For example, the OASIS™ system manufactured by Aristocrat® Technologies, Inc. includes a proprietary communication protocol used for serial communication between gaming devices. As another example, the Slot Accounting System ("SAS"), manufactured by International Game Technology PLC, includes a communication protocol used to transmit information, such as metering information, from a gaming device 200 to a remote device. Often SAS is used in conjunction with a player tracking system.

Gaming devices 200 may alternatively be treated as peripheral devices to a casino communication controller and connected in a shared daisy-chain fashion to a single serial interface. In both cases, the peripheral devices are preferably assigned device addresses. If so, the serial controller circuitry implements a method to generate or detect unique device addresses. General-purpose computer serial ports are not able to do this.

Security monitoring circuits detect intrusion into a gaming device 200 by monitoring security sensors 238 or switches attached to access doors (including the main door) of the main cabinet 218 of the gaming device 200. Preferably, access violations result in suspension of game play and can trigger additional security operations to preserve the current state of game play. These circuits also function when power is off by use of a battery backup. In power-off operation, these circuits continue to monitor the access doors (including the main door) of the gaming device 200. When power is restored, the gaming device 200 can determine whether any security violations occurred while power was off, e.g., via software for reading status registers. This can trigger event log entries and further data authentication operations by the gaming device software.

Trusted memory devices may be included in a game controller 202 of a gaming device 200 to ensure the authenticity of the software that may be stored on memory subsystems. Trusted memory devices and controlling circuitry are typically designed to not allow modification of the code and data stored in the memory device while the memory device is installed in the gaming device. The code and data stored in these devices may include authentication algorithms, RNGs, authentication keys, operating system kernels, etc. The purpose of these trusted memory devices is to provide gaming regulatory authorities a root trusted authority within the computing environment of the gaming device 200 that can be tracked and verified as original. This may be accomplished via removal of the trusted memory device from the gaming device 200 and verification of the secure memory device contents by a separate third-party verification device. Once the trusted memory device is verified as authentic, and based on the approval of the verification algorithms contained in the trusted device, the gaming device 200 is allowed to verify the authenticity of additional code and data that may be located in the game controller 202, such as code and data stored on hard disk drives. Details related to trusted memory devices that may be used in the present invention are described in U.S. Pat. No. 6,685,567, the disclosure of which is incorporated by reference.

Mass storage devices used in a general-purpose computer typically allow code and data to be read from and written to the mass storage device. In a gaming system environment, modification of the gaming code stored on a mass storage device is strictly controlled and would only be allowed under specific maintenance type events with electronic and physical enablers required. Though this level of security could be provided by software, gaming devices 200 that include mass storage devices include hardware-level mass storage data protection circuitry that operates at the circuit level to monitor attempts to modify data on the mass storage device and will generate both software and hardware error triggers should a data modification be attempted without the proper electronic and physical enablers being present.

Although the system shown in FIG. 2 illustrates one example gaming device 200 of the present invention, it is by no means the only gaming device architecture on which the present invention can be implemented. For example, an architecture having a single processor that handles communications as well as routing computations, etc. may be used. Further, other types of interfaces and media could also be used with the gaming device 200. The communication path between components may be bus-based (as shown in FIG. 2) or switch fabric based (such as a cross-bar).

III. Examples of Game Play Dynamics

This section describes various innovations in user interface ("UI") features of electronic gaming machines ("EGMs"). Some of the innovations relate to bonus reel games and other iterative re-spin processes for EGMs. Other innovations relate to configuration of reels in a base reel game, bonus reel game, or other process for special symbol stacking. In particular, some examples described herein relate to a base reel game having a special symbol stack that triggers reconfiguration of reels for conducting a progressive jackpot game.

Depending on implementation, various form factors of EGMs can incorporate these innovations. For example, for a "thick client" implementation, an EGM (such as a gaming device 104A-X in FIG. 1 or gaming device 200 in FIG. 2) stores computer-executable instructions for controlling one or more wagering games in local memory of the EGM and executes those instructions in one or more local processors of the EGM. The computer-executable instructions for controlling the game(s) may be stored within the EGM (e.g., at a factory) prior to installation of the EGM at a gaming establishment. Or, the computer-executable instructions for controlling the game(s) may be stored within the EGM after installation of the EGM at a gaming establishment (e.g., by downloading the instructions to the EGM over a network, or by installing memory that stores the instructions into the EGM, then configuring the EGM). In such a "thick client" implementation, a game controller of the EGM conducts one of the wagering game(s) and manages various interfaces of the EGM to receive player inputs and commands. Or, as another example, for a "thin client" implementation, computer-executable instructions for controlling one or more wagering games are stored in memory of a gaming server (e.g., central determination gaming system server or other remote host) and executed in one or more processors of the gaming server. The game server remotely controls one of the wagering game(s) over a network, and the EGM displays screens for the wagering game and manages interfaces to receive player inputs and commands.

In some example implementations, the EGM or gaming server can conduct a base reel game (for regular play or free spins), a bonus reel game (with iterative re-spins), and a gateway wheel game. The base reel game or bonus reel game uses spinning reels and a reel area on a display screen. As in a typical reel game, the reels of the base reel game or bonus reel game "spin" graphically through the reel area on the display screen when a user actuates a "spin" or "play" button, which acts as a "handle pull" event. The reel area is a matrix of symbols on the display screen, and may be highlighted graphically to emphasize symbols within the reel area. For each of the reels, a reel strip includes x positions along a one-dimensional strip of symbols, where x depends on implementation. For example, x is 30, 80, 100, 200, or some other number of positions. Each reel can have a data structure (e.g., array, linked list) that tracks the symbols at the respective positions of the reel strip for the reel. In general, the configuration of the symbols at the positions of the reel strips for the reels of the base reel game is fixed after the base reel game boots, although limited reconfiguration operations may be permitted. In general, the configuration of the symbols at the positions of the reel strips for the reels of the bonus reel game can change for each instance of the bonus reel game, or even within a bonus reel game. The count of symbol positions is generally the same for each of the reels within a base reel game (or bonus reel game), but the count of symbol positions per reel may be different between a base reel game and bonus reel game.

The symbol set for the base reel game includes a special symbol type (whose symbols can be stacked for an award to trigger the bonus reel game) and one or more other symbol types. In some example implementations, the symbol set for the base reel game includes a jackpot symbol type, a normal wild symbol type (whose symbols can be stacked for an award), a lucky star wild symbol type (whose symbols can be stacked to trigger a bonus reel game, and which is also a wild symbol for purposes of evaluating pay line wins), some number of picture symbol types, some number of minor/low symbol types, and a scatter symbol type (which triggers other bonuses). The symbol set for the bonus reel game includes a special symbol type (whose symbols can be stacked for an award of a progressively higher jackpot) and one or more other symbol types. In some example implementations, the symbol set for the bonus reel game includes the special symbol type and a blank symbol type.

The number of reels and dimensions of the reel area depend on implementation. In general, the reel area has an m×n configuration, with m reels and with n symbols visible per reel. In some example implementations, the reel area of the base reel game and bonus reel game has a 5×4 configuration—five reels on the display screen, with four symbols showing in the reel area for each of the reels. Alternatively, the reel area can have another configuration. The reel area for the base reel game and reel area for the bonus reel game can be the same or different.

In some example implementations, there are 50 pay lines and a 75 credit cost. There are 2×, 3×, 4×, and 5× bet multipliers (also called bet levels), which sets a max bet of 375 credits. Alternatively, there could be higher best multipliers (e.g., up to 8×, with a max bet of 600 credits), different credit options, and/or a different number of pay lines.

In terms of technical effects, innovative features of base reel games and bonus reel games described herein can improve usability of EGMs by enhancing the user experience, enticing new users to use the EGMs, and maintaining the interest of current users in the EGMs. Depending on implementation, the innovative features of the base reel games and bonus reel games described herein include, but are not limited to:

- from a base reel game, a bonus reel game is triggered by a special symbol stack appearing in the reel area for any reel;
- in a base reel game, a reel with a special symbol stack is locked for a bonus reel game;
- in a base reel game, a bet level affects the likelihood of special symbol stacks appearing in reels and hence affects the likelihood of triggering a bonus reel game;
- in a bonus reel game, a reel with a special symbol stack triggers another re-spin in the bonus reel game;
- in a bonus reel game, a reel with a special symbol stack is locked for the rest of the bonus reel game;
- in a bonus reel game, the award amount progressively increases as the count of special symbol stacks in the reel area increases;
- in a bonus reel game, a first locked reel (which may have triggered the bonus reel game from a base reel game) is counted towards an award payout; and
- in a bonus reel game, a bet level affects the likelihood of special symbol stacks appearing in reels and hence affects the likelihood of reaching better outcomes.

A. Overall Flow of Example Base Reel Games

When a user actuates a "spin" or "play" button for a reel game, which acts as a "handle pull" event, the reels of the reel game "spin" graphically through the reel area on a display screen. A game controller randomly selects positions in the respective reels, and the respective reels stop at the selected positions, with some number of symbols visible in the reel area for each of the reels. For example, for a given reel, the game controller generates a random number and determines a position on the reel strip of the reel using the random number. The game controller generates different random numbers for the respective reels that are spun. In this way, the game controller determines which symbols of the respective reels are visible in the reel area on the display screen.

In some example implementations, when the user actuates a "spin" or "play" button for the base reel game, the game controller re-configures the reels of the base reel game, as described in section III.D. In this way, the reels of the base reel game can be configured to show symbols of a special symbol type before the reels are spun. Alternatively, the reels of the base reel game are not re-configured when the user actuates a "spin" or "play" button, and the reels always show symbols of the special symbol type.

After the reels have landed for a round of play of the base reel game, the game controller determines whether any win conditions exist and awards any win amounts to the player (e.g., credited to the player's credit balance). The base reel game defines one or more win conditions, the occurrence of which results in a win amount being awarded. For example, win conditions are defined as pay lines (also called win lines) across at least a portion of the reel area on a display screen. For each round of play, when a certain combination of symbols appears along a pay line, the game controller awards a win amount, or winnings, corresponding to that combination of symbols and that pay line. Win amounts can vary according to the combination of symbols and according to the particular pay line along which the combination of symbols appears. Win amounts are typically determined according to a pay table defined for the base reel game, where the pay table comprehends the various combinations of symbols and pay lines, i.e., the win conditions that may occur in the base reel game. The win amount for a round of play may be a fraction of an amount wagered for that round of play for certain win conditions. For other win conditions, the win amount may be much larger than the amount wagered.

After the reels have landed for a round of play of the base reel game, the game controller also evaluates whether the bonus reel game has been triggered. In general, the game controller evaluates a start condition for the bonus reel game. For example, the game controller checks whether the reel area encloses, for any of the reels, a special symbol stack. A special symbol stack is, for example, an arrangement of n symbols of a special symbol type in sequence, spanning the reel area on the display screen (a "full" stack of the special symbol type). In general, n is a whole number greater than 1 (e.g., 4 when the viewable portion of a reel has 4 symbol positions). A special symbol stack in a reel can be part of a longer sequence of symbols of the special symbol type. Thus, the game controller detects whether one or more full stacks of special symbols appear in the viewable portions of the respective reels. Depending on implementation, the special symbols can be lucky star wild symbols, normal wild symbols, or other symbols. If the start condition is satisfied (e.g., at least one special symbol stack), the game controller transitions to the bonus reel game, reconfiguring reels and starting an instance of the bonus reel game. Alternatively, a special symbol stack can be defined differently (e.g., a "partial" stack less than a full stack, or a row of special symbols across all rows).

Figure 3:
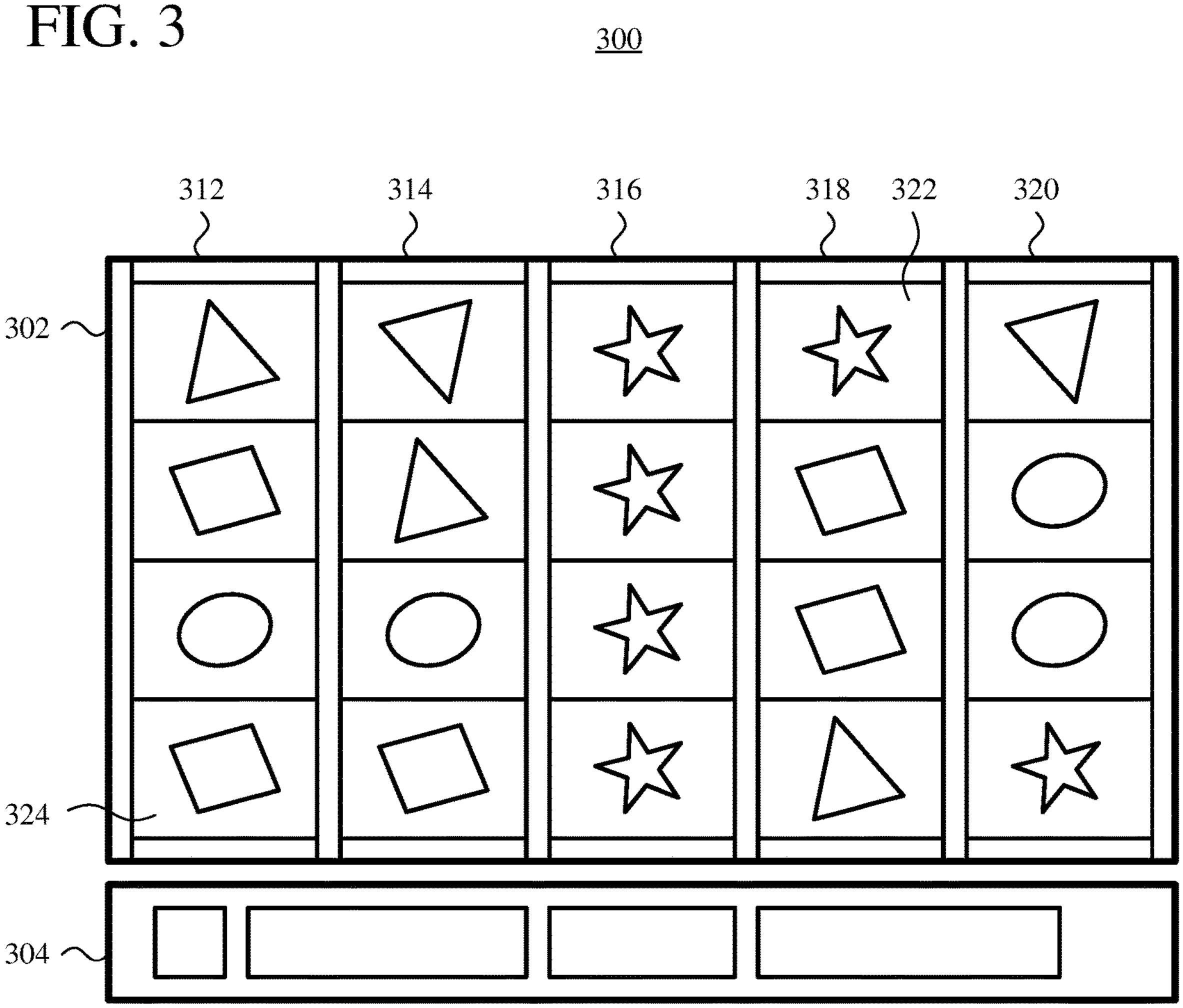
FIG. 3 is a representation of an example screen shot of a display screen of an EGM for a base reel game, showing an event that triggers a transition to a bonus reel game, according to some example implementations.

FIG. 3 shows an example screen shot 300 of a display screen of an EGM for a base reel game. In particular, the example screen shot 300 illustrates an event that triggers a transition to a bonus reel game, according to some example implementations. The example screen shot 300 may be rendered on a main display screen, secondary display screen, or other display screen of an EGM.

The example screen shot 300 shows a reel area 302 and supplemental information area 304. The reel area 302 shows viewable portions of five reels 312, 314, 316, 318, 320. For each of the five reels 312, 314, 316, 318, 320, the viewable portion of the reel encloses four positions of symbols that span the reel area. The symbols include special symbols (shown as the star symbol 322) and other symbols (such as the tilted rectangle 324). As noted, in some example implementations, the special symbol is a luck star wild symbol. Alternatively, the special symbol can be some other type of symbol. In FIG. 3, the middle reel 316 includes a full stack of special symbols, which spans the reel area 302. The special symbol stack in the middle reel 316 is a sequence of four special symbols. The reel area 302 encloses the four special symbols of the stack in the middle reel 316, which triggers the bonus reel game. The supplemental information area 304 presents information such as a current bet amount, a current bet level (e.g., 1×, 2×, 3×, 4×, 5×), a count of pay lines that are monitored, an amount of credits remaining, and/or a win amount for a round of play.

B. Overall Flow of Example Bonus Reel Games

An EGM may include a bonus feature that, when triggered, results in an award (bonus award) to a player, in the form of an opportunity for the player to win additional awards. A bonus feature may enhance an EGM and the experience of players by adding elements of excitement and chance. One type of bonus feature is a bonus reel game, such as a jackpot game or progressive jackpot game, which provides an additional game of chance on the same EGM as a base reel game. A bonus reel game can utilize a different set of reels, display screens, controls, symbols, etc. than a base reel game. Alternatively, a bonus reel game can reuse or reconfigure at least some of the reels, display screens, symbols, etc. of a base reel game.

When a bonus reel game is triggered, a game controller can switch to a different set of reels than the base reel game. The game controller can dynamically configure reels for the bonus reel game, or load previously configured reels for the bonus reel game. In some example implementations, reels for a bonus reel game include only special symbols and blank symbols. For example, the special symbols are lucky star wild symbols. The number of positions for symbols in the reel strip of a reel may be fixed, but the proportion of special symbols (versus blank symbols) can depend on bet level. Alternatively, the reels of a bonus reel game can include other and/or additional symbols. Section III.E describes examples of configuration operations for reels of a bonus reel game.

In any case, the reels of a bonus reel game include special symbol stacks. A special symbol stack is, for example, an arrangement of n symbols of a special symbol type in sequence, spanning the reel area on the display screen (a "full" stack of the special symbol type). In general, n is a whole number greater than 1 (e.g., 4). A special symbol stack in a reel can be part of a longer sequence of symbols of the special symbol type. Alternatively, a special symbol stack can be defined differently (e.g., a "partial" stack less than a full stack, or a row of special symbols across all rows).

The game controller locks any reels that have special symbol stacks in the reel area on the display screen. Such reels can be locked for the duration of the bonus reel game. The locked reels can include one or more reels of the base reel game that triggered the bonus reel game as well as any reels for which special symbol stacks land in the reel area during spins of the bonus reel game. In this manner, special symbol stacks are held in place in the reel area while any remaining reels are re-spun in the course of the bonus reel game.

When a user actuates a "spin" or "play" button of the bonus reel game, which acts as a "handle pull" event, any unlocked reels of the bonus reel game "spin" graphically through the reel area on a display screen. The game controller randomly selects positions in the respective unlocked reels, and the respective unlocked reels stop at the selected positions, with some number of symbols visible in the reel area for each of the unlocked reels. The game controller evaluates (1) whether any special symbol stacks have landed for the remaining unlocked reels that were just spun, and (2) whether there are any reels without special symbol stacks landed in the reel area. If so (that is, there was at least one additional occurrence of a special symbol stack in the unlocked reels in the last spin, and there is at least other unlocked reel available for a re-spin), the reel(s) for which a special symbol stack landed are locked for the rest of the bonus reel game, and an additional spin of the bonus reel game is triggered for any remaining, unlocked reels (without special symbol stacks). In some example implementations, a single additional spin of the bonus reel game is awarded if there are any additional occurrences of a special symbol stack among the unlocked reels, regardless of the number of occurrences.

Otherwise (that is, none of the unlocked reels that were just spun has a special symbol stack in the reel area, or all reels have special symbol stacks landed in the reel area), the game controller performs operations to exit the bonus reel game. The game controller awards an amount based on the count of special symbol stacks in the reel area. For example, the game controller awards a jackpot award that increases as the count of special symbol stacks in the reel area increases, awarding one jackpot award per instance of the bonus reel game. In some example implementations, the game controller awards a first amount for 1 special symbol stack, awards a second, higher amount for 2 special symbol stacks, awards a third, higher amount for 3 special symbol stacks, awards a fourth, higher amount for 4 special symbol stacks, and awards a fifth, highest amount for 5 special symbol stacks. Each of the award amounts can progressively increase as wagers are made in the base reel game, starting from an initial amount and continuing until the award amount is paid out. Thus, each of the jackpots can start at initial levels and increase as players add credits, until someone wins a jackpot at a level. Alternatively, only some subset of the award amounts can increase progressively. Thus, the iterative re-spin process of the bonus reel game repeats until (1) all reels have special symbol stacks in the reel area or (2) a given re-spin results in no additional special symbol stacks in the reel area, at which point the bonus reel game ends and a jackpot is awarded.

Figure 4A:
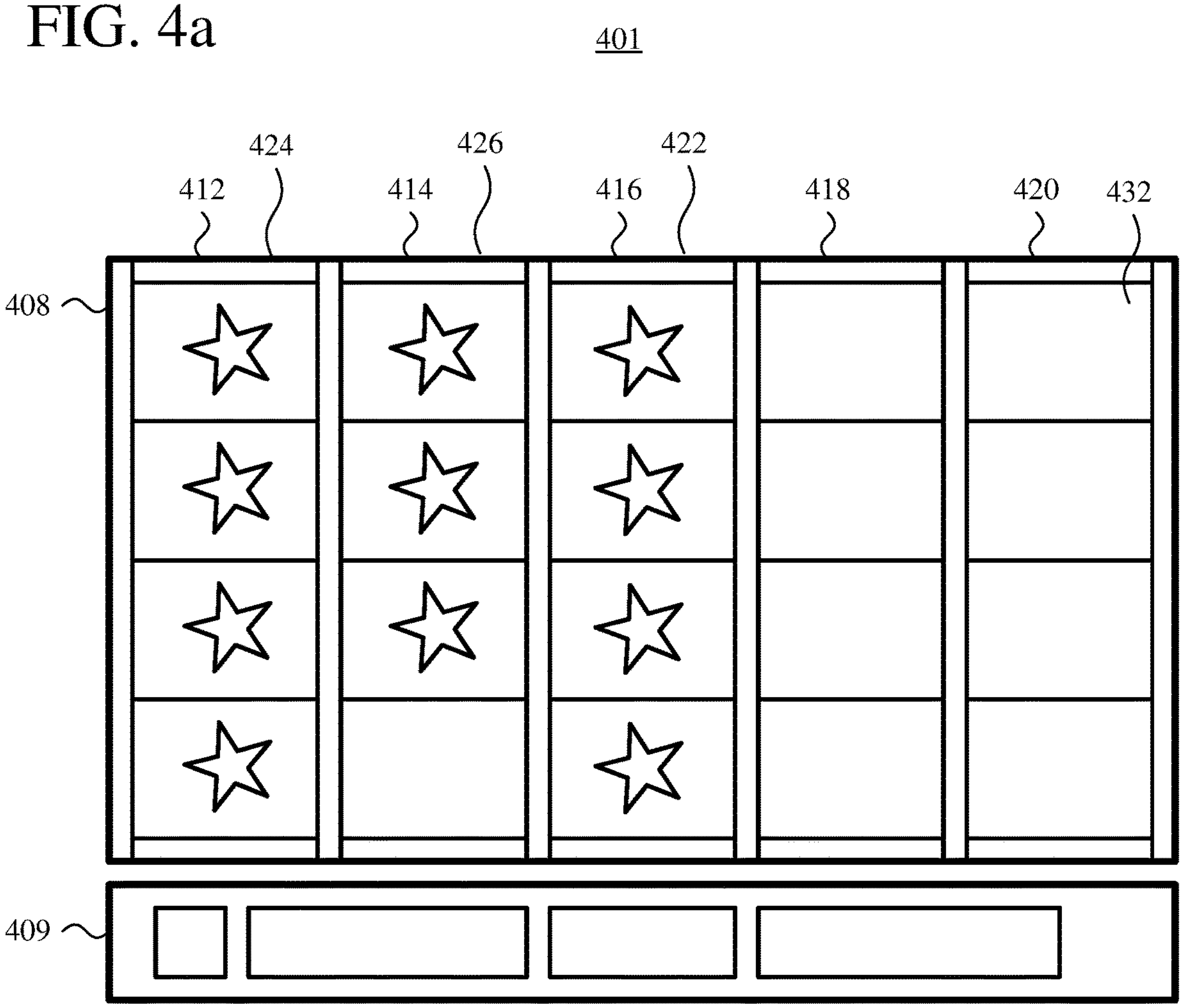
Figure 4B:
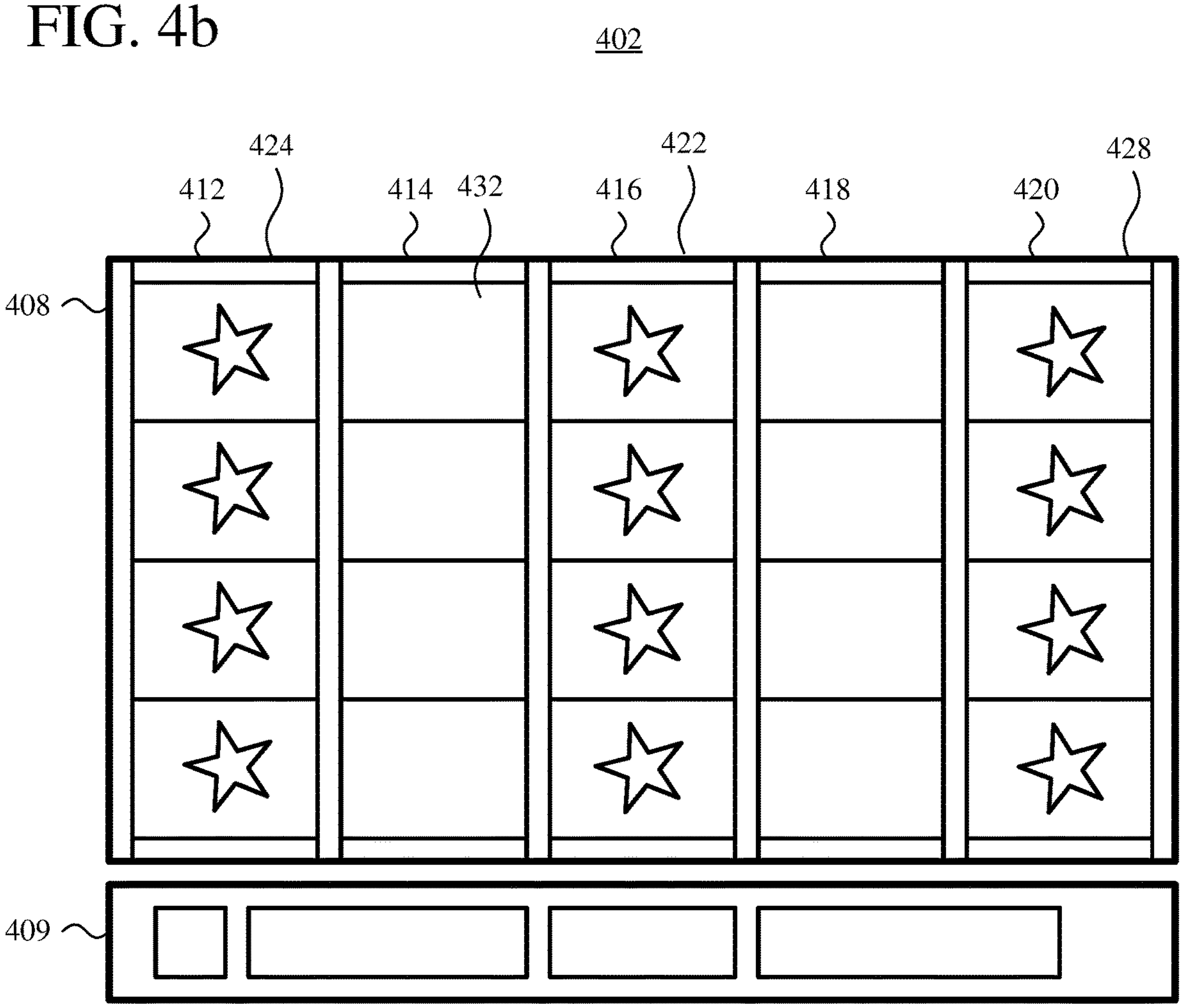
Figure 4C:
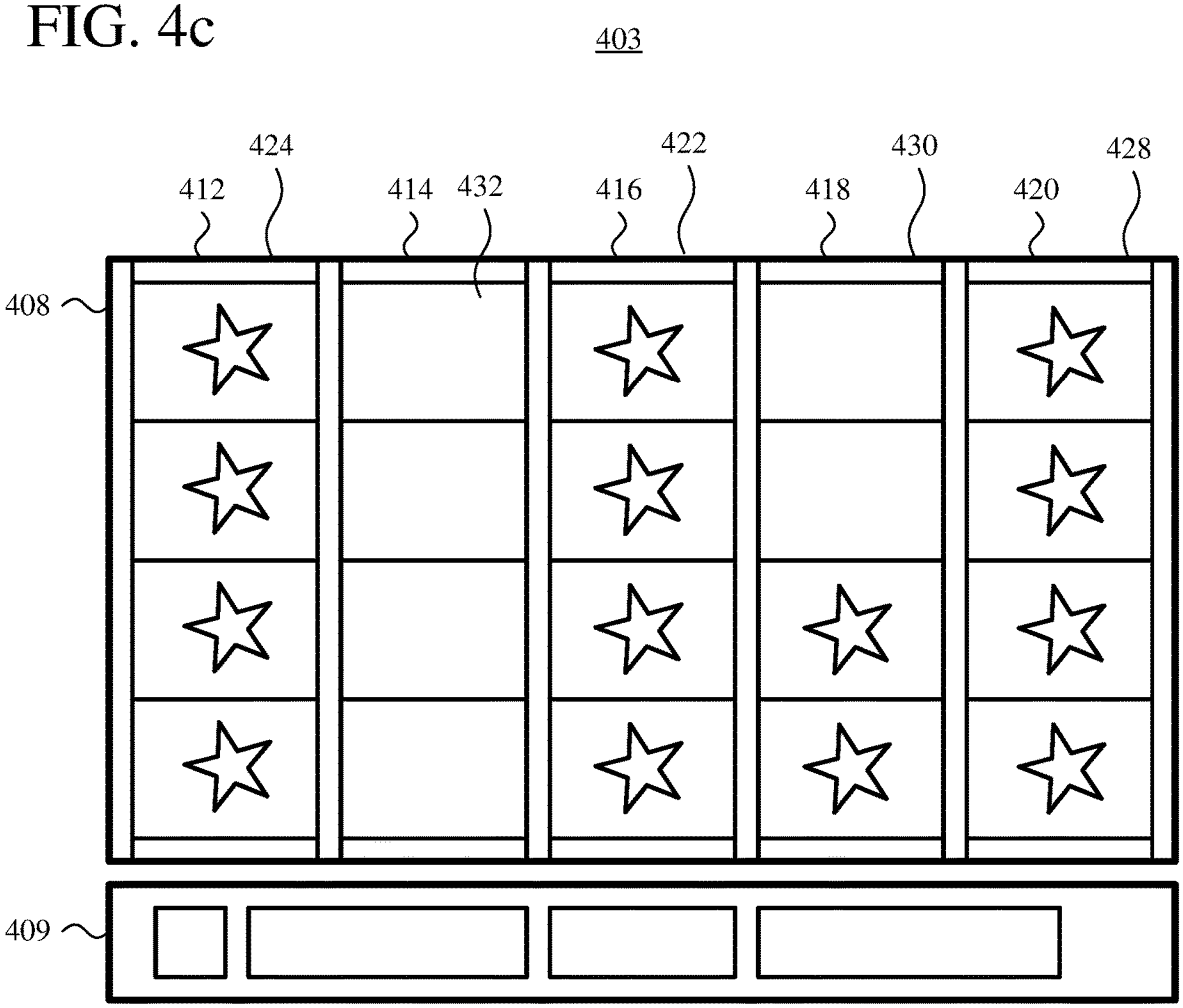

FIGS. 4*a*-4*c* show a sequence of example screen shots 401, 402, 403 of a display screen of an EGM for a bonus reel game. The example screen shots 401, 402, 403 may be rendered on a main display screen, secondary display screen, or other display screen of an EGM. Each of the example screen shots 401, 402, 403 shows a reel area 408 and a supplemental information area 409, which can present information such as a current bet level, an amount of credits remaining, and/or a win amount. The reel area 408 shows viewable portions of five reels 412, 414, 416, 418, 420. For each of the five reels 412, 414, 416, 418, 420, the viewable portion of the reel includes four positions of symbols that span the reel area. The symbols include special symbols (shown as the star symbol) and other symbols (such as the blank symbol 432). As noted, in some example implementations, the special symbol is a luck star wild symbol. Alternatively, the special symbol can be some other type of symbol. (In FIGS. 4*a*-4*c*, the reels 412, 414, 416, 418, 420 of the bonus reel game have been reconfigured, compared to the reels 312, 314, 316, 318, 320 of the base reel game shown in FIG. 3.)

FIG. 4*a* shows an example screen shot 401 after a first spin of the bonus reel game. In FIG. 4*a*, the middle reel 416 includes a full stack 422 of special symbols spanning the reel area 408. The middle reel 416 was locked in the base reel game, when the middle reel 416 (or a corresponding middle reel in the base reel game) triggered the bonus reel game, and is held in place during the bonus reel game. The remaining, unlocked reels 412, 414, 418, 420 were re-spun in the first spin of the bonus reel game. After the first spin, the first reel 412 shows a full stack 424 of special symbols, which landed in the first spin of the bonus reel game, triggering a re-spin of the bonus reel game. The reel area 408 encloses the four special symbols in a stack in the first reel 412, which is locked for the rest of the bonus reel game. After the first spin, the second reel 414 shows a partial stack 426 of special symbols. The reel strip for the second reel 414 might include a sequence of at least four special symbols, but the reel area 408 encloses fewer than four of those special symbols for the second reel 414.

FIG. 4*b* shows an example screen shot 402 after a second spin of the bonus reel game. The first reel 412 and the middle reel 416 were locked during the second spin. The remaining, unlocked reels 414, 418, 420 were re-spun in the second spin of the bonus reel game. As shown in FIG. 4*b*, after the second spin, the fifth reel 420 shows a full stack 428 of special symbols, which landed in the second spin of the bonus reel game, triggering a re-spin of the bonus reel game. The reel area 408 encloses the four special symbols in a stack in the fifth reel 420, which is locked for the rest of the bonus reel game.

FIG. 4*c* shows an example screen shot 403 after a third spin of the bonus reel game. The first reel 412, middle reel 416, and fifth reel 420 were locked during the third spin. The remaining, unlocked reels 414, 418 were re-spun in the third spin of the bonus reel game. As shown in FIG. 4*c*, after the third spin, the fourth reel 418 shows a partial stack 430 of special symbols. The reel strip for the fourth reel 418 could include a sequence of at least four special symbols, but the reel area 408 encloses fewer than four of those special symbols in a stack in the fourth reel 418. Since no new full stacks of special symbols landed in the reel area 408 in the third spin, no additional re-spin is awarded, and the bonus reel game exits. The game controller awards a jackpot based on the count of special symbol stacks in the reel area 408 for the reels 412, 414, 416, 418, 420. In the example screen shot 403 of FIG. 4*c*, the award amount is based on the three special symbol stacks for the three reels 412, 416, 420.

In some example implementation, the progression of award amounts in the bonus reel game is visible to players and adds elements of suspense and excitement to the bonus reel game. The bonus reel game makes clear what is needed—another special symbol stack—to reach the next level of the jackpot. In particular, the staging of operations (with iterative locking of reels and re-spinning of unlocked reels) provides a build up to higher award amounts that is engaging for players. In contrast, a bonus reel game that simply awards a re-spin when a special symbol stack lands for a reel, without locking that reel, lacks elements of visual progression towards higher award amounts.

C. Example Start Conditions for Bonus Reel Games

As explained in sections III.A and III.B, a bonus reel game can be triggered from a base reel game when a start condition is satisfied. Alternatively, a bonus reel game can be triggered in another way. For example, a bonus reel game can be triggered from a gateway wheel. The gateway wheel can be a physical spinning wheel or virtual spinning wheel. The gateway wheel can includes other prizes as well (e.g., game credits, other bonus games). If the bonus reel game is triggered from the gateway wheel, the overall mechanics of the bonus reel game can be the same as if triggered from the base reel game. Alternatively, the configuration of reels of the bonus reel game can change, depending on whether the bonus reel game is triggered from the gateway wheel or base reel game, as explained in section III.E. For example, there can be more special symbols in the reel strips for the reels if the bonus reel game is triggered from the gateway wheel. Alternatively, the configuration of reels of the bonus reel game can change depending on whether the bonus reel game is triggered from the base reel game in regular play or as part of free spins awarded in the base reel game, as described in section III.E. For example, there can be more special symbols in the reel strips for the reels if the bonus reel game is triggered from free spins awarded in the base reel game.

Alternatively, the bonus reel game can be triggered in some other way.

D. Example Configurations for Special Symbols in Base Reel Games

The reels of the base reel game can be dynamically configured per "handle pull" event of the base reel game. For example, when a user actuates a "spin" or "play" button, which acts as a "handle pull" event, the game controller can re-configure the reels of the base reel game, selectively changing any placeholder on the reel strips of the respective reels to either a special symbol or other, non-special symbol.

In some example implementations, the placement and proportion of wild symbols and non-wild symbols on the reel strips for the reels are fixed in the base reel game from the time the base reel game is initialized, and the placement and proportion of wild symbols and non-wild symbols on the reel strips are the same for every bet level. For a spin of the base reel game, however, the game controller selectively changes any wild symbol (placeholder) on the reel strips of the respective reels to either a special wild symbol (e.g., a lucky star wild symbol) or normal wild symbol. The normal wild symbols and special wild symbols act as wild symbols for purposes of determining awards on pay lines. In addition, if a stack of the normal wild symbols or special wild symbols lands in the reel area for a reel, a special bonus award can be triggered. In particular, if a stack of the special wild symbols lands in the reel area for a reel, a bonus reel game is triggered.

The game controller can decide whether to use the special symbol or other symbol for all reels collectively, for each reel on a reel-by-reel basis, or for each position on a position-by-position basis. For example, for a decision between the special symbol and other symbol, the game controller can generate a random number and compare the random number to a threshold value in a weighted table. The weighted table gives a percentage chance that the placeholder will be the special symbol and a percentage chance that the placeholder will be the other symbol. If the random number is at least the threshold value, the game controller changes the placeholder for a reel (or placeholders for a reel or set of reels) of the base reel game to the special symbol (e.g., lucky star wild symbol). Otherwise (the random number is less than the threshold value), the game controller changes the placeholder for a reel (or placeholders for a reel or set of reels) of the base reel game to the other symbol (e.g., normal wild symbol). Alternatively, the test for the threshold value can be different (e.g., greater than/not greater than) or the decision can be switched (special symbol for low values/other symbol for high values).

The bet level for the base reel game can affect whether placeholders in the reel strips for reels are changed to the special symbol or other symbol. For example, the threshold value in the weighted table can vary depending on bet level. The threshold values for different bet levels depend on implementation. In some example implementations, if the bet level is 1×, 2×, 3×, 4×, or 5×, the threshold level is set so that the special symbol is selected 3%, 6%, 9%, 12%, or 15% of the time, respectively, and the other symbol is selected 97%, 94%, 91%, 88%, or 85% of the time, respectively. Alternatively, the threshold values can be set to other values. In this way, the bet level for the base reel game can affect the likelihood of a special symbol stack landing in the reel area during the base reel game and thereby triggering the bonus reel game, with higher bet levels leading to more special symbol stacks landing in the reel area during the base reel game and triggering the bonus reel game more often.

The mode of the base reel game can also affect whether placeholders in the reel strips for reels are changed to the special symbol or other symbol. If a "handle pull" event is for a free spin of the base reel game, there can be more special symbols than if the "handle pull" event is for regular play. For example, the threshold value in the weighted table can vary depending on whether the "handle pull" event is for regular play or a free spin of the base reel game. A different weighted table can be used for a free spin, or the threshold value can be changed by some amount (e.g., 10, 20), so that special symbols are more likely. The threshold values can also vary depending on bet level, as described above.

Alternatively, the reels of the base reel game can be preset for an instance of the base reel game, regardless of bet level. Or, the reels of the base reel game can be preset for different bet levels.

E. Example Configurations for Special Symbols in Bonus Reel Games

The reels of the bonus reel game can be dynamically configured per instance of the bonus reel game or even per "handle pull" event of the bonus reel game. For example, when the bonus reel game is triggered, the game controller can re-configure the reels of the bonus reel game. The game controller can selectively change the symbol at any position on the reel strips of the respective reels to either a special symbol or other, non-special symbol.

The placement and proportion of special symbols and other symbols on the reel strips for the reels can be set in the bonus reel game when the bonus reel game is initialized, or the placement and proportion of special symbols and other symbols can be set per "handle pull" event of the bonus reel game. In some example implementations, the special symbol is a lucky star wild symbol, and the other symbol is a blank symbol. This symbol set helps avoid potential confusion between the base reel game (where winning combinations along pay lines are awarded) and the bonus reel game (which lacks pay lines).

The game controller can decide whether to use the special symbol or other symbol for each position on a position-by-position basis. For example, for a decision between the special symbol and other symbol, the game controller can generate a random number and compare the random number to a threshold value in a weighted table. The weighted table gives a percentage chance that the placeholder will be the special symbol and a percentage chance that the placeholder will be the other symbol. If the random number is at least the threshold value, the game controller sets the symbol at a position for a reel of the bonus reel game to the special symbol (e.g., lucky star wild symbol). Otherwise (the random number is less than the threshold value), the game controller sets the symbol at the position for a reel of the bonus reel game to the other symbol (e.g., blank symbol). Alternatively, the test for the threshold value can be different (e.g., greater than/not greater than) or the decision can be switched (special symbol for low values/other symbol for high values).

The bet level for the bonus reel game (which is the bet level for the base reel game) can affect whether positions in the reel strips for reels are set to the special symbol or other, non-special symbol. For example, the threshold value in the weighted table can vary depending on bet level. The threshold values for different bet levels depend on implementation. In some example implementations, if the bet level is 1×, 2×, 3×, 4×, or 5×, the threshold level is set so that the special symbol is selected 3%, 6%, 9%, 12%, or 15% of the time, respectively, and the other symbol is selected 97%, 94%, 91%, 88%, or 85% of the time, respectively. Alternatively, the threshold values can be set to other values. In this way, the bet level for the bonus reel game can affect the quantity of special symbols being populated into the reels of the bonus reel game, with higher bet levels leading to more special symbols in the reels. This, in turn, affects the likelihood of a special symbol stack landing in the reel area during the bonus reel game and thereby triggering additional spins of the bonus reel game and awarding a higher jackpot amount. Higher bet levels lead to more special symbol stacks landing in the reel area during the bonus reel game, triggering re-spins in the bonus reel game more often, with higher jackpot awards also being more likely.

Alternatively, the reels of the bonus reel game can be preset for an instance of the bonus reel game, regardless of bet level. Or, the reels of the bonus reel game can be preset for different bet levels.

IV. Example Techniques for Configuring Reels

FIG. 5 shows a generalized technique 500 for controlling a user interface ("UI") of an electronic gaming machine ("EGM") for special symbol stacking in a process such as a base process or iterative re-spin process. For example, the process is a base reel game or bonus reel game. Control logic (such as a game controller 202 described with reference to FIG. 2) can perform the technique 500. The control logic can be implemented using one or more processors that are part of the EGM or part of a gaming system located remotely from the EGM.

At stage 510, the control logic starts a process that uses reels and a reel area on a display screen of the EGM. Each of the reels of the process has an associated reel strip that is movable through the reel area on the display screen upon execution of a spin of the reel. For example, the process uses m reels, where m is 2, 3, 4, 5, 6, 7, 8, or some other number of reels. The reel area can span the m reels in a first dimension and span n symbols in a second dimension orthogonal to the first dimension, where n is 2, 3, 4, 5, 6, or some other number of symbols. For example, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels.

At stage 520, the control logic determines a control level. For example, the control logic determines a bet level as described in section III. Alternatively, the control logic determines the control level in some other way. At stage 530, the control logic determines a likelihood of a special symbol type based at least in part on the control level. For example, the control logic determines a likelihood of a special symbol type using a weighted table and a random number generator, as described in section III. Alternatively, the control logic determines the likelihood of a special symbol type in some other way.

Figure 6A:
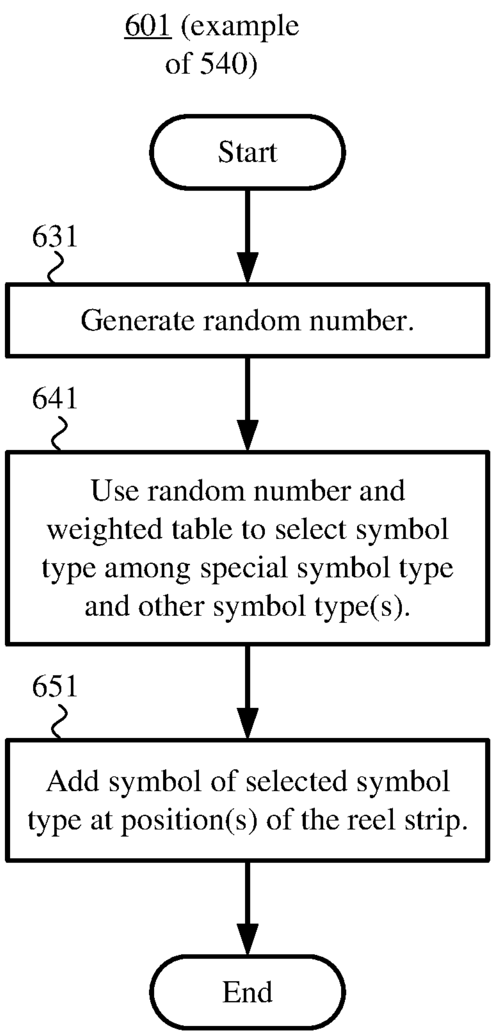
Figure 6B:
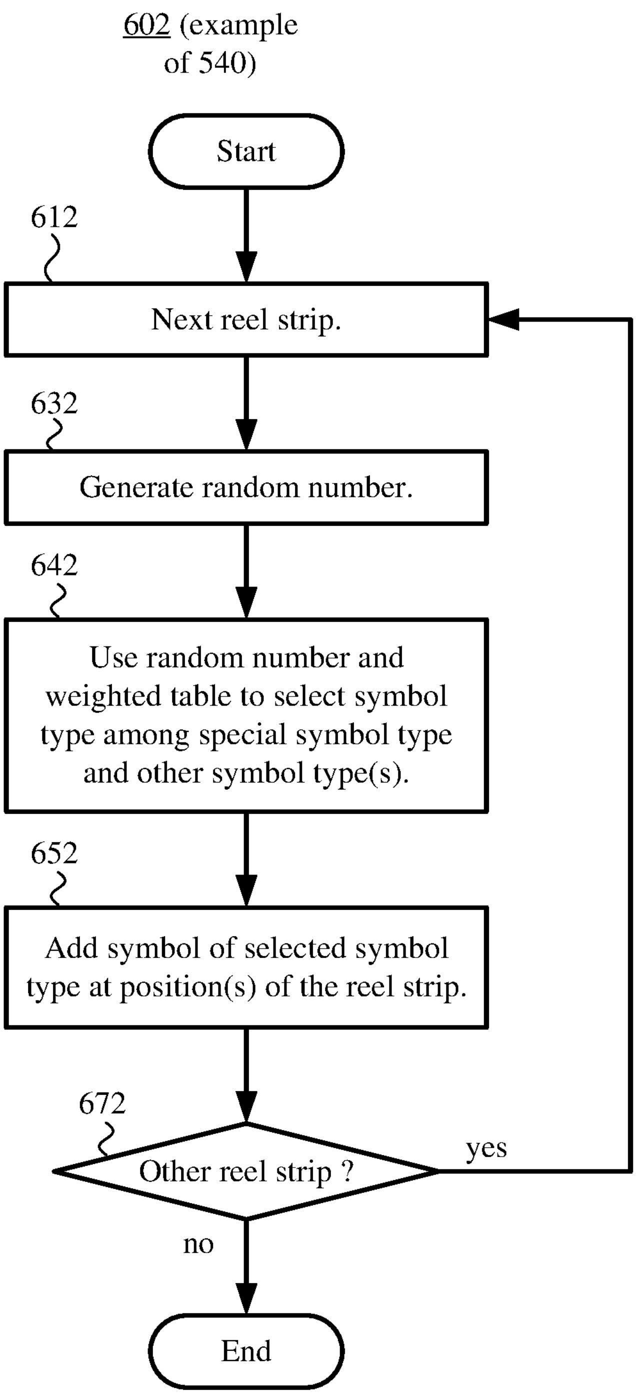
Figure 6C:
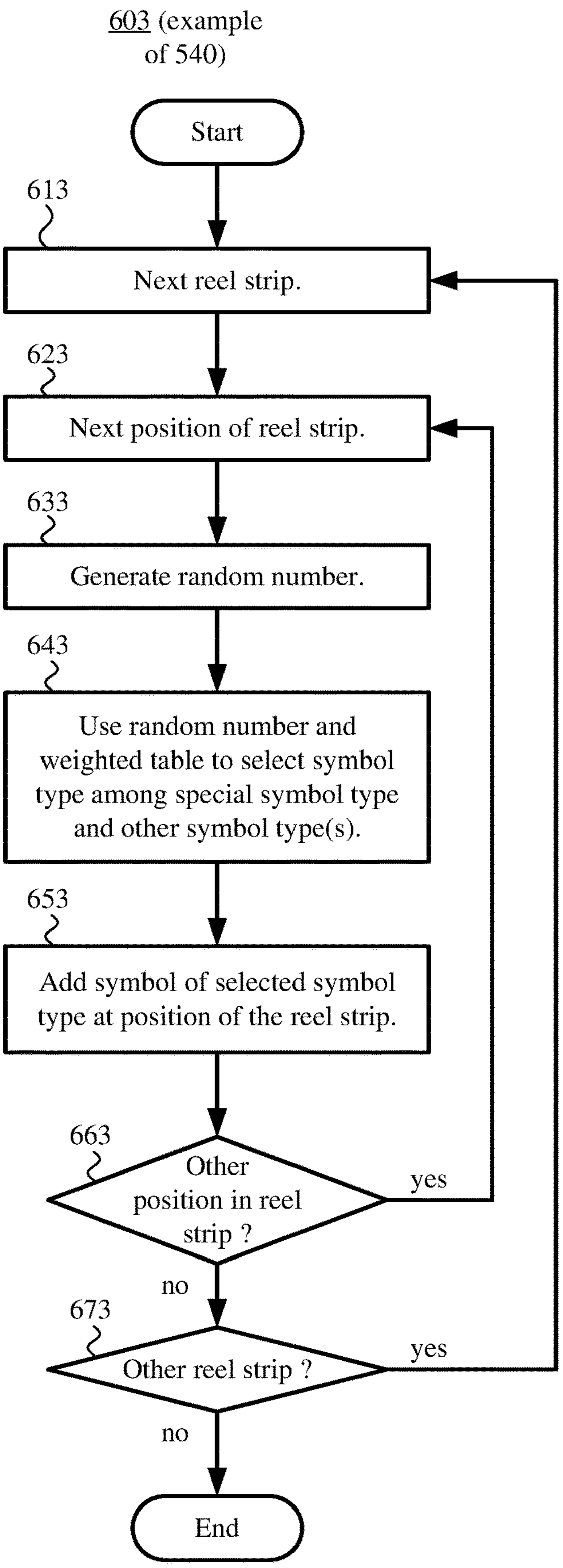

At stage 540, based at least in part on the likelihood of the special symbol type, the control logic selectively populates or re-populates the reel strips of the reels of the process with symbols of the special symbol type and symbols of one or more other symbol types. For example, the control logic performs operations as shown in FIG. 6*a*, 6*b*, or 6*c*. Alternatively, the control logic performs other operations to selectively populate or re-populate the reel strips of the reels with symbols of the special symbol type and symbols of other symbol type(s).

FIG. 6*a* shows a first example technique 601 for selectively populating or re-populating reel strips of reels with symbols of a special symbol type or other symbol type. At stage 631, the control logic generates a random number. At stage 641, the control logic uses the random number and a weighted table to select a symbol type among the special symbol type and one or more other symbol types. At stage 651, at each position of one or more positions of one or more of the reel strips of the reels of the process, the control logic adds a symbol of the selected symbol type. In this way, the control logic can make a single decision for all of the reels about whether to use the special symbol type or another symbol type for the affected positions of the reels.

FIG. 6*b* shows a second example technique 602 for selectively populating or re-populating reel strips of reels with symbols of a special symbol type or other symbol type. In the second example technique 602, the control logic makes a decision per reel about whether to use the special symbol type or another symbol type for the affected positions of that reel. The control logic performs operations for each reel strip of one or more of the reel strips of the reels of the process. At stage 612, the control logic identifies the next reel strip. The control logic generates (at stage 632) a random number and uses (at stage 642) the random number and a weighted table to select a symbol type among the special symbol type and one or more other symbol types. At stage 652, the control logic adds a symbol of the selected symbol type at each position of one or more positions of the reel strip. The control logic checks (at stage 672) whether to continue for a next reel strip of another reel of the process and, if so, identifies the next reel strip.

In some example implementations, the process is a base process (e.g., base reel game). The special symbol type is a special wild symbol type, and the other symbol type(s) include a normal wild symbol type. As part of the second example technique 602, the control logic selects (at stage 642) a symbol type among the special wild symbol type and the normal wild symbol type. At stage 652, at each position of one or more positions of the reel strip that have a wild symbol, the control logic sets the symbol at the position of the reel strip to be a symbol of the selected symbol type. The control logic can repeat the determining the control level (stage 520), the determining the likelihood of the special symbol type (stage 530), the selectively populating or re-populating (stage 540/602), the spinning (stage 550), and the locking (stage 560) in each iteration of one or more iterations of the base process.

FIG. 6*c* shows a third example technique 603 for selectively populating or re-populating reel strips of reels with symbols of a special symbol type or other symbol type. In the third example technique 603, the control logic makes a decision per affected position of a reel strip about whether to use the special symbol type or another symbol type for that position. The control logic performs operations for each reel strip of one or more of the reel strips of the reels of the process. At stage 613, the control logic identifies the next reel strip. The control logic performs operations for each of multiple affected positions of that reel strip. At stage 623, the control logic identifies the next affected position of the reel strip. The control logic generates (at stage 633) a random number and uses (at stage 643) the random number and a weighted table to select a symbol type among the special symbol type and one or more other symbol types. At stage 653, the control logic adds a symbol of the selected symbol type at the position of the reel strip. The control logic checks (at stage 663) whether to continue for another position in the reel strip and, if so, identifies the next affected position of the reel strip. Otherwise, the control logic checks (at stage 673) whether to continue for a next reel strip of another reel of the process and, if so, identifies the next reel strip.

In some example implementations, the process is an iterative re-spin process (e.g., bonus reel game). The special symbol type is a special wild symbol type, and the other symbol type is a blank symbol type. As part of the third example technique 603, the control logic selects (at stage 643) a symbol type among the special wild symbol type and the blank symbol type. At stage 653, the control logic sets the symbol at a position of the reel strip to be a symbol of the selected symbol type. The control logic can repeat the determining the control level (stage 520), the determining the likelihood of the special symbol type (stage 530), the selectively populating or re-populating (stage 540/603), the spinning (stage 550), and the locking (stage 560) in each iteration of one or more iterations of the iterative re-spin process.

Returning to FIG. 5, at stage 550, the control logic spins any unlocked reels, among the reels of the process, on the display screen. For example, to spin one of the unlocked reels, the control logic moves the reel strip of the reel through the reel area on the display screen, generates a random number, and stops the movement of the reel strip of the reel on the display screen at a position of the reel strip that is based at least in part on the random number. Alternatively, the control logic spins the reel using some other combination of operations.

At stage 560, the control logic locks any of the unlocked reels for which the reel area on the display screen encloses a special symbol stack. The special symbol stack is, for example, an arrangement of n symbols of the special symbol type in sequence, spanning the reel area on the display screen. In general, n is a whole number greater than 1 (e.g., 4). A special symbol stack in a reel can be part of a longer sequence of symbols of the special symbol type. Alternatively, a special symbol stack can be defined differently (e.g., a "partial" stack less than a full stack, or a row of special symbols across all rows). To lock a reel, the control logic can change lock state for the reel from unlocked to locked, or (if the reel was already locked) keep the lock state for the reel as locked.

At stage 570, the control logic checks whether to continue in another iteration of the process and, if so, selectively re-spins unlocked reels.

V. Example Techniques for Performing Iterative Re-Spin Processes

FIG. 7 shows a generalized technique 700 for controlling a user interface ("UI") of an electronic gaming machine ("EGM") for an iterative re-spin process. For example, the iterative re-spin process is a bonus reel game. Control logic (such as a game controller 202 described with reference to FIG. 2) can perform the technique 700. The control logic can be implemented using one or more processors that are part of the EGM or part of a gaming system located remotely from the EGM.

At stage 710, the control logic starts an iterative re-spin process that uses reels and a reel area on a display screen of the EGM. Each of the reels of the iterative re-spin process has an associated reel strip that is movable through the reel area on the display screen upon a spin of the reel. The display screen can be the main display screen of the EGM or a secondary display screen. For example, the process uses m reels, where m is 2, 3, 4, 5, 6, 7, 8, or some other number of reels. The reel area can span the m reels in a first dimension and span n symbols in a second dimension orthogonal to the first dimension, where n is 2, 3, 4, 5, 6, or some other number of symbols. For example, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels.

The control logic can start the iterative re-spin process in response to satisfaction of a start condition in a base process (e.g., base reel game) that uses reels and the reel area on the display screen. Each of the reels of the base process, which may be different than the reels of the iterative re-spin process, has an associated reel strip that is movable through the reel area upon a spin of the reel. The start condition is satisfied when the reel area on the display screen encloses, for at least one of reels of the base process, a special symbol stack. The special symbol stack is, for example, an arrangement of n symbols of a special symbol type in sequence, spanning the reel area on the display screen. In general, n is a whole number greater than 1 (e.g., 4). A special symbol stack in a reel can be part of a longer sequence of symbols of the special symbol type. Alternatively, a special symbol stack can be defined differently (e.g., a "partial" stack less than a full stack, or a row of special symbols across all rows). Since the base process and iterative re-spin process can use different reels, the control logic can replace reel strips for at least some of the reels of the base process to initialize corresponding ones of the reels of the iterative re-spin process. Thus, in some example implementations, the control logic can start a bonus reel game (example of iterative re-spin process) when the special symbol stack is detected in the reel area on the display screen during a base reel game (example of base process). Alternatively, the iterative re-spin process can be started in response to identification of the iterative re-spin process as an outcome of a supplemental process (e.g., a supplemental wheel game) or triggered in some other way.

At stage 720, the control logic can dynamically configure reels of the iterative re-spin process. For example, the control logic performs operations as shown in FIG. 8. Alternatively, the control logic performs other operations to dynamically configure reels of the iterative re-spin process.

FIG. 8 shows an example technique 800 for dynamically configuring reels for an iterative re-spin process. The control logic determines (at stage 810) a control level and determines (at stage 820) a likelihood of a special symbol type based at least in part on the control level. At stage 830, based at least in part on the likelihood of the special symbol type, the control logic selectively populates the reel strips of the reels of the iterative re-spin process with symbols of the special symbol type and symbols of one or more other symbol types. For example, the control logic selectively populates the reel strips of the reels of the iterative re-spin process as described with reference to FIG. 6*c*. The control logic can perform the determining the control level (stage 810), the determining the likelihood of the special symbol type (stage 820), and the selectively populating (830) before any iterations of the iterative re-spin process (e.g., during initialization of the iterative re-spin process), and the reels are kept throughout the iterative re-spin process. Alternatively, the control logic can perform the determining the control level (stage 810), the determining the likelihood of the special symbol type (stage 820), and the selectively populating (830) during one or more iterations of the iterative re-spin process (e.g., as part of each iteration of the iterative re-spin process).

At stage 730, the control logic performs the iterative re-spin process. For example, the control logic performs operations as shown in FIG. 9. Alternatively, the control logic performs other operations for the iterative re-spin process.

FIG. 9 shows an example technique 900 for performing operations of an iterative re-spin process. As part of the example technique 900, the control logic performs operations in given iteration of one or more iterations of the iterative re-spin process. The control logic can initiate each of the iteration(s) in response to actuation of a button of the EGM (e.g., a "play" button or "spin" button), which is indicated by user input that the control logic receives.

At stage 910, the control logic identifies any locked reels, among the reels of the iterative re-spin process, for the given iteration. For each of the identified locked reels for the given iteration, the reel area on the display screen encloses a special symbol stack for the reel. To lock a reel, the control logic can change lock state for the reel from unlocked to locked, or (if the reel was already locked) keep the lock state for the reel as locked.

At stage 920, the control logic spins any unlocked reels, among the reels of the iterative re-spin process, for the given iteration on the display screen. For example, to spin an unlocked reel, the control logic moves the reel strip of the reel through the reel area on the display screen, generates a random number, and stops the movement of the reel strip of the reel on the display screen at a position of the reel strip that is based at least in part on the random number. Alternatively, the control logic spins the reel using some other combination of operations. Any identified locked reels for the given iteration are held in place on the display screen during the spinning of unlocked reels.

In some scenarios, at least one of the reels of the iterative re-spin process never spins as part of the iterative re-spin process. This can happen, for example, when such reel(s) are locked in an initial iteration of the iterative re-spin process. In some example implementations, one or more reels of a base reel game (example of base process) are locked when transitioning to a bonus reel game (example of iterative re-spin process).

At stage 930, the control logic evaluates a continuation condition. The continuation condition depends, at least in part, on whether the reel area on the display screen encloses, for at least one of any unlocked reels for the given iteration (which were spun in the given iteration), a special symbol stack. The continuation condition can also depend, at least in part, on the reel area on the display screen not enclosing a special symbol stack for at least one of the reels of the iterative re-spin process. (That is, there is at least one remaining reel, not enclosing a special symbol stack, to re-spin.) If the continuation condition is satisfied ("yes" branch from stage 940), the control logic continues the iterative re-spin process in a next iteration of the iteration(s), as the given iteration. Depending on implementation, the reel strips of unlocked reels can be unchanged between iterations or be reconfigured between iterations, as described with reference to FIG. 8. Thus, in some example implementations, if, during the bonus reel game (example of iterative re-spin process), the control logic detects additional special symbol stacks in the reel area on the display screen, the control logic locks any reel with a special symbol stack and awards a re-spin of the remaining reel(s). If the continuation condition is not satisfied ("no" branch from stage 940), the control logic performs operations to exit the iterative re-spin process.

With reference to FIG. 7, at stage 740, the control logic determines a count of special symbol stacks in the reel area upon exit from the iterative re-spin process. At stage 750, based least in part on the count of special symbol stacks in the reel area, the control logic determines an outcome of the iterative re-spin process. For example, the control logic sets an amount that progressively increases as the count of special symbol stacks in the reel area increases. In some example implementations, the control logic awards a jackpot corresponding to the count of special symbol stacks in the reel area on the display screen at the end of the bonus reel game. At stage 760, the control logic outputs an indication of the outcome of the iterative re-spin process. For example, the control logic renders a graphic (e.g., image, animation) that indicates the outcome of the iterative re-spin process on the main display screen or a secondary display screen of the EGM.

VI. Alternatives and Variations

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed embodiments.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

It will be readily apparent that the various methods and algorithms described herein may be implemented by, e.g., appropriately programmed general-purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for a gaming market, embodiments of the invention can be implemented for other markets. The gaming system environment of the examples is not intended to suggest any limitation as to the scope of use or functionality of any aspect of the disclosure.

In addition to the appended claims, inventive features of the present disclosure include, but are not limited to, the following features.

| | Feature |
|---|---|
| A1 | One or more non-transitory computer-readable media having stored thereon computer-executable instructions for causing one or more processors, when programmed thereby, to perform operations to control a user interface of an electronic gaming machine ("EGM"), the operations comprising:<br>starting an iterative re-spin process that uses reels and a reel area on a display screen of the EGM, each of the reels of the iterative re-spin process having an associated reel strip that is movable through the reel area on the display screen upon a spin of the reel;<br>in a given iteration of one or more iterations of the iterative re-spin process:<br>identifying any locked reels, among the reels of the iterative re-spin process, for the given iteration, wherein, for each of the identified any locked reels for the given iteration, the reel area on the display screen encloses a special symbol stack;<br>spinning any unlocked reels, among the reels of the iterative re-spin process, for the given iteration on the display screen while holding the identified any locked reels for the given iteration in place;<br>evaluating a continuation condition that depends at least in part on whether the reel area on the display screen encloses, for at least one of the any unlocked reels for the given iteration, the special symbol stack; and<br>if the continuation condition is satisfied, continuing the iterative re-spin process in a next iteration of the one or more iterations as the given iteration;<br>determining a count of special symbol stacks in the reel area upon exit from the iterative re-spin process;<br>based least in part on the count of special symbol stacks in the reel area, determining an outcome of the iterative re-spin process; and<br>outputting an indication of the outcome of the iterative re-spin process. |

-continued

| | Feature |
|---|---|
| B1 | One or more non-transitory computer-readable media having stored thereon computer-executable instructions for causing one or more processors, when programmed thereby, to perform operations to control a user interface of an electronic gaming machine ("EGM"), the operations comprising:<br>starting a process that uses reels and a reel area on a display screen of the EGM, each of the reels of the process having an associated reel strip that is movable through the reel area on the display screen upon execution of a spin of the reel;<br>determining a control level;<br>determining a likelihood of a special symbol type based at least in part on the control level;<br>based at least in part on the likelihood of the special symbol type, selectively populating or re-populating the reel strips of the reels of the process with symbols of the special symbol type and symbols of one or more other symbol types;<br>spinning any unlocked reels, among the reels of the process, on the display screen; and<br>locking any of the unlocked reels for which the reel area on the display screen encloses a special symbol stack. |
| B2 | An electronic gaming machine ("EGM") comprising:<br>a cabinet;<br>a display screen;<br>one or more input buttons;<br>a credit input device; and<br>control logic configured to perform operations to control a user interface of the EGM, the operations comprising:<br>starting a process that uses reels and a reel area on a display screen of the EGM, each of the reels of the process having an associated reel strip that is movable through the reel area on the display screen upon execution of a spin of the reel;<br>determining a control level;<br>determining a likelihood of a special symbol type based at least in part on the control level;<br>based at least in part on the likelihood of the special symbol type, selectively populating or re-populating the reel strips of the reels of the process with symbols of the special symbol type and symbols of one or more other symbol types;<br>spinning any unlocked reels, among the reels of the process, on the display screen; and<br>locking any of the unlocked reels for which the reel area on the display screen encloses a special symbol stack. |
| B3 | An electronic gaming server comprising<br>a network interface configured to facilitate communication between the electronic gaming server and an electronic gaming machine ("EGM"); and<br>control logic configured to perform operations to control a user interface of the EGM, the operations comprising:<br>starting a process that uses reels and a reel area on a display screen of the EGM, each of the reels of the process having an associated reel strip that is movable through the reel area on the display screen upon execution of a spin of the reel;<br>determining a control level;<br>determining a likelihood of a special symbol type based at least in part on the control level;<br>based at least in part on the likelihood of the special symbol type, selectively populating or re-populating the reel strips of the reels of the process with symbols of the special symbol type and symbols of one or more other symbol types;<br>spinning any unlocked reels, among the reels of the process, on the display screen; and<br>locking any of the unlocked reels for which the reel area on the display screen encloses a special symbol stack. |
| B4 | A method of controlling a user interface of an electronic gaming machine ("EGM"), the method comprising:<br>starting a process that uses reels and a reel area on a display screen of the EGM, each of the reels of the process having an associated reel strip that is movable through the reel area on the display screen upon execution of a spin of the reel;<br>determining a control level;<br>determining a likelihood of a special symbol type based at least in part on the control level;<br>based at least in part on the likelihood of the special symbol type, selectively populating or re-populating the reel strips of the reels of the process with symbols of the special symbol type and symbols of one or more other symbol types;<br>spinning any unlocked reels, among the reels of the process, on the display screen; and<br>locking any of the unlocked reels for which the reel area on the display screen encloses a special symbol stack. |
| B5 | The feature of any of B1 to B4, wherein the selectively populating or re-populating includes:<br>generating a random number;<br>using the random number and a weighted table to select a symbol type among the special symbol type and the one or more other symbol types; and<br>at each position of one or more positions of one or more of the reel strips of the reels of the process, adding a symbol of the selected symbol type. |

-continued

| | Feature |
|---|---|
| B6 | The feature of any of B1 to B4, wherein the selectively populating or re-populating includes, for each reel strip of one or more of the reel strips of the reels of the process: generating a random number; using the random number and a weighted table to select a symbol type among the special symbol type and the one or more other symbol types; and at each position of one or more positions of the reel strip, adding a symbol of the selected symbol type. |
| B7 | The feature of any of B1 to B4, wherein the selectively populating or re-populating includes, for each reel strip of one or more of the reel strips of the reels of the process: for each of multiple positions of the reel strip: generating a random number; using the random number and a weighted table to select a symbol type among the special symbol type and the one or more other symbol types; and adding a symbol of the selected symbol type at the position of the reel strip. |
| B8 | The feature of any of B1 to B4, wherein the process is a base process. |
| B9 | The feature of B8, wherein the special symbol type is a special wild symbol type, and the one or more other symbol types include a normal wild symbol type. |
| B10 | The feature of B9, wherein the selectively populating or re-populating includes, for each reel strip of one or more of the reel strips of the reels of the process: generating a random number; using the random number and a weighted table to select a symbol type among the special wild symbol type and the normal wild symbol type; and at each position of one or more positions of the reel strip that have a wild symbol, setting the symbol at the position of the reel strip to be a symbol of the selected symbol type. |
| B11 | The feature of B8, wherein the determining the control level, the determining the likelihood of the special symbol type, the selectively populating or re-populating, the spinning, and the locking are repeated in each iteration of one or more iterations of the base process. |
| B12 | The feature of any of B1 to B4, wherein the process is an iterative re-spin process. |
| B13 | The feature of B12, wherein the special symbol type is a special wild symbol type, and the one or more other symbol types are a blank symbol type. |
| B14 | The feature of B13, wherein the selectively populating or re-populating includes, for each reel strip of one or more of the reel strips of the reels of the process: for each of multiple positions of the reel strip: generating a random number; using the random number and a weighted table to select a symbol type among the special wild symbol type and the blank symbol type; and setting the symbol at the position of the reel strip to be a symbol of the selected symbol type. |
| B15 | The feature of B12, wherein the determining the control level, the determining the likelihood of the special symbol type, the selectively populating or re-populating, the spinning, and the locking are repeated in each iteration of one or more iterations of the iterative re-spin process. |
| B16 | The feature of any of B1 to B4, wherein: the spinning any unlocked reels on the display screen includes, for each of the any unlocked reels: moving the reel strip of the reel through the reel area on the display screen; generating a random number; and stopping the movement of the reel strip of the reel on the display screen at a position of the reel strip of the reel that is based at least in part on the random number; and lock state for any locked reel is changed from unlocked to locked. |
| B17 | The feature of any of B1 to B4, wherein the special symbol stack is an arrangement of n symbols of the special symbol type in sequence, spanning the reel area on the display screen, wherein n is a whole number greater than 1. |
| B18 | The feature of any of B1 to B4, wherein the one or more processors are: part of the EGM; or part of a gaming system located remotely from the EGM. |
| B19 | The feature of any of B1 to B4, wherein: the process uses m reels, m being selected from the group consisting of 2, 3, 4, 5, 6, 7, and 8; and the reel area spans the m reels in a first dimension and spans n symbols in a second dimension orthogonal to the first dimension, n being selected from the group consisting of 2, 3, 4, 5, and 6. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. One or more non-transitory computer-readable media having stored thereon computer-executable instructions for causing one or more processors, when programmed thereby, to perform operations to manage return to player for an iterative re-spin process of an electronic gaming device, the operations comprising:

starting an iterative re-spin process that uses reels and a reel area on a display screen of the electronic gaming device, each of the reels of the iterative re-spin process having an associated reel strip that is movable through the reel area on the display screen up on a spin of the reel, wherein the reel area spans m reels in a first dimension and spans n symbols in a second dimension different than the first dimension;

storing, in a memory device, current state information of the electronic gaming device;

storing, in the memory device, a determined control level, wherein the control level is determined based at least in part on the stored current state information;

retrieving, from the memory device, a likelihood of a special symbol type, wherein the retrieved likelihood of the special symbol is based at least in part on the stored control level and a first returned value of a random number generator;

based at least in part on the retrieved likelihood of the special symbol type, selectively populating the reel strips of the reels of the iterative re-spin process with symbols of the special symbol type and symbols of one or more other symbol types, thereby affecting return to player by adjusting likelihoods of reaching different outcomes of the iterative re-spin process depending on the determined control level; and for each given iteration of one or more iterations of the iterative re-spin process:

storing, in the memory device, information identifying, based on a lock state stored in the memory device for each reel, any locked reels, among the reels of the iterative re-spin process, for the given iteration, wherein, for each of the identified locked reels for the given iteration, the reel area is caused to be displayed on the display screen as enclosing a special symbol stack;

causing each special symbol stack to remain displayed on the display screen during the given iteration;

determining, based on at least a second returned value of the random number generator, results for spinning any unlocked reels, among the reels of the iterative re-spin process, for the given iteration, wherein the unlocked reels are reels that were not identified as being locked reels among the reels of the iterative re-spin process, for the given iteration;

displaying, on the display screen, a spinning and stopping of the unlocked reels, wherein the spinning and stopping of the unlocked reels causes the determined results to be displayed on the display screen;

modifying, in the memory device, the lock state of any unlocked reel that displays the special symbol stack as part of the displayed results from an unlocked state to a locked state;

determining, based on a comparison of the displayed determined results with a continuation condition stored in the memory device, whether the continuation condition is satisfied for the given iteration;

if the continuation condition is satisfied, causing the display of a next iterative re-spin process of the one or more iterations; and if the continuation condition is not satisfied, exiting the iterative re-spin process.

2. The one or more non-transitory computer-readable media of claim 1, wherein the selectively populating includes, for each reel strip of one or more of the reel strips of the reels of the iterative re-spin process:

for each of multiple positions of the reel strip:

generating a random number;

using the random number and a weighted table to select a symbol type among the special symbol type and the one or more other symbol types; and adding a symbol of the selected symbol type at the position of the reel strip.

3. The one or more non-transitory computer-readable media of claim 1, wherein the special symbol type is a special wild symbol type and the one or more other symbol types are a blank symbol type.

4. The one or more non-transitory computer-readable media of claim 1, wherein each of the one or more iterations of the iterative re-spin process is initiated in response to actuation of a button of the electronic gaming device.

5. The one or more non-transitory computer-readable media of claim 1, wherein the iterative re-spin process is started in response to satisfaction of a start condition in a base process that uses reels and the reel area on the display screen.

6. The one or more non-transitory computer-readable media of claim 1, wherein the iterative re-spin process is started in response to identification of the iterative re-spin process as an outcome of a supplemental process.

7. The one or more non-transitory computer-readable media of claim 1, wherein at least one of the reels of the iterative re-spin process never spins as part of the iterative re-spin process, the at least one of the reels of the iterative re-spin process being locked in an initial iteration of the one or more iterations of the iterative re-spin process by having its lock state set to a locked state.

8. The one or more non-transitory computer-readable media of claim 1, wherein the continuation condition also depends at least in part on whether the reel area on the display screen is not to enclose the special symbol stack for at least one of the any unlocked reels spun in the given iteration.

9. The one or more non-transitory computer-readable media of claim 1, wherein the special symbol stack is an arrangement of n symbols of a special symbol type in sequence along one of the reels, the arrangement of n symbols spanning the reel area on the display screen in the second dimension, and wherein n is a whole number greater than 1.

10. The one or more non-transitory computer-readable media of claim 1, wherein the operations further comprise:

determining a count of special symbol stacks in the reel area upon exit from the iterative re-spin process; and based least in part on the count of special symbol stacks in the reel area, determining an outcome of the iterative re-spin process.

11. The one or more non-transitory computer-readable media of claim 10, wherein the determining the outcome of the iterative re-spin process includes setting an amount, wherein possible values for the amount progressively increase as the count of special symbol stacks in the reel area increases.

12. A method of managing return to player for an iterative re-spin process of an electronic gaming device, the method comprising:

starting an iterative re-spin process that uses reels and a reel area on a display screen of the electronic gaming device, each of the reels of the iterative re-spin process having an associated reel strip that is movable through the reel area on the display screen upon a spin of the reel, wherein the reel area spans m reels in a first dimension and spans n symbols in a second dimension different than the first dimension;

storing, in a memory device, current state information of the electronic gaming device;

storing, in the memory device, a determined control level, wherein the control level is determined based at least in part on the stored current state information;

retrieving, from the memory device, a likelihood of a special symbol type, wherein the retrieved likelihood of the special symbol is based at least in part on the stored control level and a first returned value of a random number generator;

based at least in part on the retrieved likelihood of the special symbol type, selectively populating the reel strips of the reels of the iterative re-spin process with symbols of the special symbol type and symbols of one or more other symbol types, thereby affecting return to player by adjusting likelihoods of reaching different outcomes of the iterative re-spin process depending on the determined control level;

for each given iteration of one or more iterations of the iterative re-spin process:

storing, in the memory device, information identifying, based on a lock state stored in the memory device for each reel, any locked reels, among the reels of the iterative re-spin process, for the given iteration, wherein, for each of the identified locked reels for the given iteration, the reel area is caused to be displayed on the display screen as enclosing a special symbol stack;

causing each special symbol stack to remain displayed on the display screen during the given iteration;

determining based on at least a second returned value of the random number generator, results for spinning any unlocked reels, among the reels of the iterative re-spin process, for the given iteration, wherein the unlocked reels are reels that were not identified as being locked reels among the reels of the iterative re-spin process, for the given iteration;

displaying, on the display screen, a spinning and stopping of the unlocked reels, wherein the spinning and stopping of the unlocked reels causes the determined results to be displayed on the display screen;

modifying, in the memory device, the lock state of any unlocked reel which displays the special symbol stack as part of the displayed results from an unlocked state to a locked state;

determining, based on a comparison of the displayed determined results with a continuation condition stored in the memory device, whether the continuation condition is satisfied for the given iteration;

if the continuation condition is satisfied, causing the display of a next iterative re-spin process of the one or more iterations; and if the continuation condition is not satisfied, performing operations to exit the iterative re-spin process;

determining a count of special symbol stacks in the reel area upon exit from the iterative re-spin process; and based, at least in part, on the count of special symbol stacks in the reel area, determining an outcome of the iterative re-spin process.

13. The method of claim 12, wherein the selectively populating includes, for each reel strip of one or more of the reel strips of the reels of the iterative re-spin process:

for each of multiple positions of the reel strip:

generating a random number;

using the random number and a weighted table to select a symbol type among the special symbol type and the one or more other symbol types; and adding a symbol of the selected symbol type at the position of the reel strip.

14. The method of claim 12, wherein the special symbol type is a special wild symbol type and the one or more other symbol types are a blank symbol type.

15. The method of claim 12, wherein storing the determined control level, storing the likelihood of the special symbol type, and the selectively populating are performed before any of the one or more iterations of the iterative re-spin process.

16. The method of claim 12, wherein storing the determined control level, storing the likelihood of the special symbol type, and the selectively populating are performed during the one or more iterations of the iterative re-spin process.

17. The method of claim 12, wherein at least one of the reels of the iterative re-spin process never spins as part of the iterative re-spin process, the at least one of the reels of the iterative re-spin process being locked in an initial iteration of the one or more iterations of the iterative re-spin process by having its lock state set to a locked state.

18. An electronic gaming device comprising control logic configured to perform operations to control a user interface of the electronic gaming device, the operations comprising:

starting an iterative re-spin process that uses reels and a reel area on a display screen of the electronic gaming device, each of the reels of the iterative re-spin process having an associated reel strip that is movable through the reel area on the display screen upon a spin of the reel, and each of the reels of the iterative re-spin process having a lock state stored in a memory device, wherein the reel area spans m reels in a first dimension and spans n symbols in a second dimension different than the first dimension; and storing, in the memory device, current state information of the electronic gaming device;

for each given iteration of one or more iterations of the iterative re-spin process:

based at least in part upon a lock state stored in the memory device for respective ones of the reels of the iterative re-spin process, determining which of the reels of the iterative re-spin process to spin for the given iteration, including identifying any locked reels, among the reels of the iterative re-spin process, for the given iteration, wherein, for each of the identified any locked reels for the given iteration, the reel area is caused to be displayed on the display screen as enclosing a special symbol stack, and wherein, for each of the identified locked reels for the given iteration, the lock state for the reel is a locked state;

causing each special symbol stack to remain displayed on the display screen during the given iteration;

determining, based on at least a first returned value of a random number generator, results for spinning any unlocked reels, among the reels of the iterative re-spin process, for the given iteration, wherein the unlocked reels are reels that were not identified as being locked reels among the reels of the iterative re-spin process, for the given iteration;

displaying, on the display screen, a spinning and stopping of the unlocked reels, wherein the spinning and stopping of the unlocked reels causes the determined results to be displayed on the display screen;

modifying, in the memory device, the lock state of any unlocked reel that displays the special symbol stack as part of the displayed results from an unlocked state to a locked state;

determining, based on a comparison of the displayed determined results with a continuation condition stored in the memory device, whether the continuation condition is satisfied for the given iteration;

if the continuation condition is satisfied, causing the display of a next iterative re-spin process of the one or more iterations; and if the continuation condition is not satisfied, performing operations to exit the iterative re-spin process.

* * * * *